US007063757B2

(12) United States Patent
Jacot et al.

(10) Patent No.: US 7,063,757 B2
(45) Date of Patent: Jun. 20, 2006

(54) METHOD AND APPARATUS FOR APPLYING OPTICAL FILM TO GLASS

(75) Inventors: Brady Jacot, Cuyahoga Falls, OH (US); William A. Briese, Hinkley, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 0 days.

(21) Appl. No.: 10/753,780

(22) Filed: Jan. 8, 2004

(65) Prior Publication Data

US 2005/0150585 A1 Jul. 14, 2005

(51) Int. Cl.
*B32B 41/00* (2006.01)

(52) U.S. Cl. ......................... 156/64; 156/269; 156/270

(58) Field of Classification Search .................. 156/64, 156/247, 248, 249, 265, 256, 269, 270
See application file for complete search history.

(56) References Cited

U.S. PATENT DOCUMENTS

| | | | | |
|---|---|---|---|---|
| 4,192,905 | A | 3/1980 | Scheibal | |
| 4,285,752 | A | 8/1981 | Higgins | |
| 4,781,782 | A | 11/1988 | Luhman et al. | |
| 5,079,981 | A | 1/1992 | Singer et al. | |
| 5,131,301 | A | 7/1992 | Gergek | |
| 5,431,767 | A | 7/1995 | Koza et al. | |
| 5,512,808 | A | 4/1996 | Clark, Jr. et al. | |
| 5,544,558 | A | 8/1996 | Hughes | |
| 5,658,420 | A | 8/1997 | Rossini | |
| 5,678,377 | A | 10/1997 | Leopold | |
| 5,840,407 | A | 11/1998 | Futhey et al. | |
| 6,050,166 | A | 4/2000 | Gauler et al. | |
| 6,180,196 | B1 | 1/2001 | Glover et al. | |
| 6,202,524 | B1 | 3/2001 | Cunningham | |
| 6,571,849 | B1 | 6/2003 | Erickson et al. | |
| 6,634,401 | B1 | 10/2003 | Kuhn et al. | |
| 2002/0092593 | A1 | 7/2002 | Erickson | |
| 2002/0092608 | A1 * | 7/2002 | Erickson et al. | 156/247 |
| 2002/0170663 | A1 | 11/2002 | Dailey | |
| 2003/0056905 | A1 | 3/2003 | Kuhn et al. | |

FOREIGN PATENT DOCUMENTS

DE 42 12 867 A1 10/1993

(Continued)

OTHER PUBLICATIONS

3M™ Accentrim™ Products, www.3m.com/us/mfg_industrial/indtape.accentrim/index.jhtml, as visited Jan. 28, 2002.

(Continued)

*Primary Examiner*—George Koch
(74) *Attorney, Agent, or Firm*—Watts Hoffmann Co., LPA

(57) ABSTRACT

The present invention concerns a method and system for applying decorative tape to a glass sheet. The disclosed system and method allow tape segments that are shorter than a distance between a cutter and a glass engagement position to be applied by an application head to the glass sheet. The system includes the application head, a tape supply, a drive roller, a cutter, and a controller. The application head applies tape segments cut from the tape supply to the glass pane. The drive roller advances the tape dispensed by the application head. The cutter cuts end portions of each tape segment. The controller is programmed to sort moves of the application head, tape supply, drive roller, and cutter to allow tape segments that are shorter than a distance between the cutter and the glass engagement position to be applied to the glass sheet.

20 Claims, 26 Drawing Sheets

FOREIGN PATENT DOCUMENTS

| | | |
|---|---|---|
| EP | 0 770 754 A1 | 5/1997 |
| FR | 1120171 | 7/1956 |
| JP | 61-30313 | 2/1986 |

OTHER PUBLICATIONS

How to Apply, www.3m.com/us/mfg_industria...tape/accemtrim/jhtml, as visited Jan. 28, 2002.

Where to Buy, www.3m.com/us/mfg_industria...tape/accentrim/jhtml/w_index.jhtml, as visited Jan. 28, 2002.

3M™ Accentrim™ Products, www.3m.com/products.mmm.c... NYTMLW46geGSTIT4S9TCgvGSTVB17KGRg1, as visited Jan. 28, 2002.

3M™ Accentrim™ Edge Bevel B100, www.3m.com/products/mmm.c... NYTMLW46geGSTIT4S9TCgvGSTVB17KGRg1, as visited Jan. 28, 2002.

Warranty & use on a single pane of glass, www.3m.com/us/mfg_industria...m/jhtml/WarrantyonSinglePane.jhtml, as visited Jan. 28, 2002.

3M's Warranty information for use of Accentrim™tape in units, www.3m.com/us/mfg_industrial/indtape/accentrim/jhtml/UseIG.jhtml, as visited Jan. 28, 2002.

3M™ Precision Cutter M45, www.3m.com/products/mmm.c...NYTMLW46geGSTIT4S9TCgvGSTVB17KGRg1, as visited Jan. 28, 2002.

3M™ Precision Cutter M45s, 1 per case, www.3m.com.products.mmm.c... TIT4S9TCgvGSTVB17KGRg1GSFGSHQB44b1, as visited Jan. 28, 2002.

Application Table for 3M™ Accentrim™ Products, www.gedusa.com/accentrim3m.htm, as visited Jan. 28, 2002.

Accentrim™ Products, B100, B200, BW200, BW500, pp. 1-3, Nov. 5, 2001.

Helpful Hints for Application of 3M™ Accentrim™ Products, Technical Bulletin, pp. 1-2, Oct. 11, 1999.

Accentrim™ Products, Frequently Asked Questions Regarding use in the Window & Door Industry, Technical Bulletin, pp. 1-3, Jun. 4, 2001.

Frequently Asked Questions Regarding Accentrim™ Products, Marketing Bulletin, pp. 1-2, Oct. 10, 1999.

* cited by examiner

METHOD AND APPARATUS FOR APPLYING OPTICAL FILM TO GLASS

FIELD OF THE INVENTION

The present invention relates a method and apparatus for applying decorative tape to glass and, more particularly, the disclosed method and apparatus invention relates to a automated method and apparatus for precisely applying a tape that gives the appearance of cut beveled glass to a glass plate.

BACKGROUND OF THE INVENTION

Cut beveled glass is used for decorative purposes in a variety of applications, such as, in windows, doors, tables and mirrors. Cut beveled glass is expensive due to the substantial labor involved in creating the bevel. In addition, the process used to produce cut beveled glass tends to weaken the glass. It is necessary for glass manufacturers to use thicker, more expensive, glass when manufacturing beveled glass to ensure the outside edge of the bevel meets minimum thickness standards. Consumers and glass manufacturers tend to avoid cutting bevels in a pane of glass because of the high degree of difficulty associated with cutting the bevel into the glass.

Tempered glass is widely used in commercial and residential buildings. Tempered glass is hard and brittle, which makes it difficult to create a bevel on an edge of the glass.

U.S. Pat. No. 4,192,905 to Scheibal describes a transparent strip of polymeric material used to imitate a beveled edge. The transparent strip has a wedge-shaped cross-section having an angle similar to a beveled edge. The transparent strip has adhesive on one side for affixing the strip to the glass to produce a beveled edge appearance.

U.S. Pat. No. 5,840,407 to Futhey et al. describes an optical film for simulating beveled glass. The optical film has a structured surface for providing a simulated beveled appearance. The structured surface is formed of a plurality of spaced parallel grooves that form a plurality of facets that simulate beveled glass.

Minnesota Mining and Manufacturing (3M) sells a tape that creates the effect of cut glass when applied to a glass surface under the trademark Accentrim™. One version of the Accentrim™ product includes a tape portion and a liner or backing that is removed before the tape portion is applied to a glass surface to create the appearance of a bevel. 3M advertising indicates that the Accentrim™ tape can be used on windows, doors, cabinetry, entertainment centers, bookcases, mirrors and other furniture.

U.S. Pat. No. 6,202,524 discloses a glass workpiece locating system. The glass work piece locating system includes a stop that positions the glass workpiece substantially perpendicular to the direction of a conveyor. A sensor senses one of the side edges of the glass workpiece to determine the position of the glass workpiece.

The '524 patent also discloses, as prior art, a glass workpiece positioning system for a cutting table that utilizes an edge sensor for determining the precise location of the workpiece. A conveyor will transport a workpiece onto the cutting table into engagement with a stop, positioning the glass workpiece in an arbitrary location on the cutting table. An edge-detecting sensor will move across the cutting table until it has detected at least three edges of the workpiece. Detection of the three edges allows the precise orientation of the glass workpiece to be determined. The movement of the cutting head assembly is adjusted according to the specific positioning of the glass workpiece. The adjustment of the cutting head assembly generally requires a rotation of a coordinate system used to control movement of the cutting head to correspond to the orientation of the glass workpiece.

SUMMARY OF THE INVENTION

The present invention concerns a method and system for applying decorative tape to a glass sheet. The disclosed system and method allow tape segments to be applied that are shorter than a distance between a cutter and a glass engagement position to where the tape is applied by an application head to the glass sheet or pane.

The system includes the application head, a tape supply, a drive roller, a cutter, and a controller. The application head applies tape segments to the glass pane that are cut from the tape supply. The drive roller advances the tape dispensed by the application head. The cutter cuts end portions of each tape segment. The controller is programmed to:

i) identify multiple tape segments to be applied to the glass pane ii) identify the position of each tape segment on the glass pane;

iii) calculate movements by the application head, the drive roller, and the cutter required to apply the multiple tape segments to the glass pane;

iv) sort the calculated movements based on the calculated movement of the drive roller for each movement; and v) execute the movements in the sorted order to apply the multiple tape segments to the glass pane.

In one embodiment, the movements required to apply each tape segment comprise a first movement where tape is advanced by the drive roller as the application head moves with respect to the glass pane, a second movement where tape is advanced by the drive roller as the application head moves with respect to the glass pane and the cutter cuts an end of the tape segment, a third movement where tape is advanced from the application head by the drive roller as the application head moves with respect to the glass pane, and a fourth movement where a pressure roller presses a tape segment end portion against the glass plate.

In one embodiment, the controller coordinates movement of the drive roller and movement of the application head such that a distance traveled by the application head is equal to a length of tape advanced by the drive roller.

In one embodiment, the controller selects a first segment to be applied that has a length that is greater than a distance between the cutter and a glass engagement position.

In one embodiment, this length is greater than four inches. In one embodiment, the controller sorts the calculated movements of the application head, drive roller, and cutter to prevent backwards movement of the drive roller.

The system can be used in a method of applying short tape segments to a glass pane. In one method tape is advanced from a supply to a cutter. The tape is cut with the cutting implement to form a first end of a first tape segment. The first end of the first tape segment is advanced to a glass engagement position where it is applied to the glass pane. The tape is cut with the cutting implement to form a second end of the first tape segment. The second end of the first tape segment is advanced to the glass engagement position where it is applied to the glass pane. The tape is also cut with the cutting implement to form a second tape segment having first and second ends before the second end of the first tape segment is advanced to the glass engagement position. This allows tape segments that are shorter than a distance between the cutter and a glass engagement position to be applied to the glass pane.

Additional features of the invention will become apparent and a fuller understanding obtained by reading the following detailed description in connection with the accompanying drawings.

DETAILED DESCRIPTION OF THE PREFERRED EMBODIMENTS

Figure 1A:
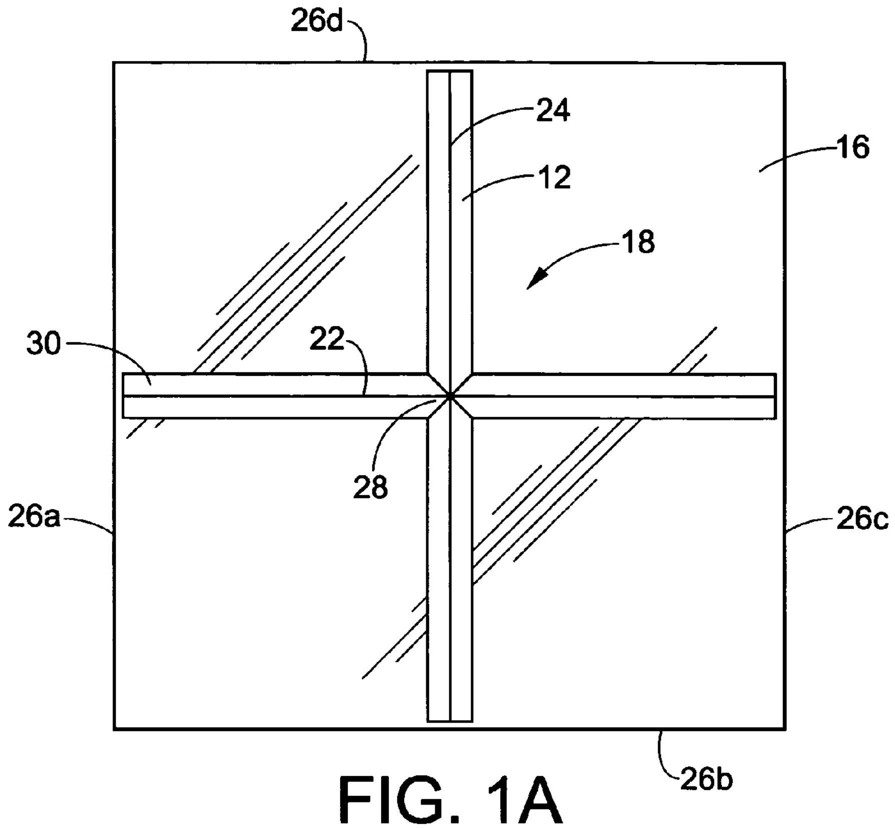
FIG. 1A is an elevational view of tape applied to a glass pane in a decorative pattern.
Figure 1B:
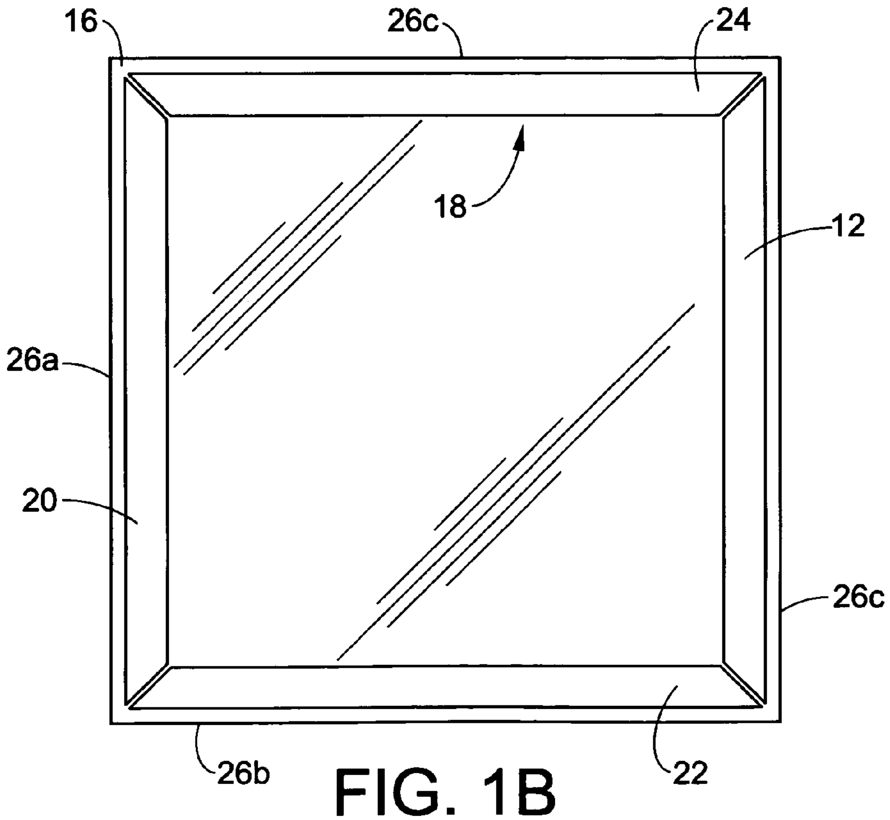
FIG. 1B is an elevational view of tape applied to a glass pane in a decorative pattern.

The present disclosure concerns a system 10 for applying tape 12 having a liner 14 or backing to a glass pane 16 in a decorative pattern 18. Examples of decorative tape patterns 18 applied to glass panes 16 by the disclosed system 10 are illustrated in FIGS. 1A and 1B. The decorative pattern 18 depicted in FIG. 1A creates the appearance of mitered glass. The decorative pattern depicted in FIG. 1B is referred to as a frame pattern 20. The frame pattern 20 creates the appearance of a beveled edge on the sides of the glass pane.

Figure 2A:
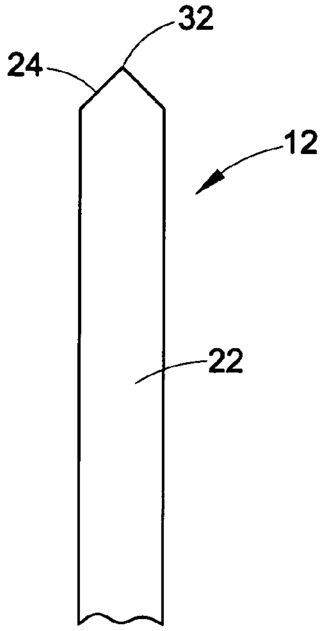
FIG. 2A is atop plan view of a length of tape having a pointed end portion.
Figure 2B:
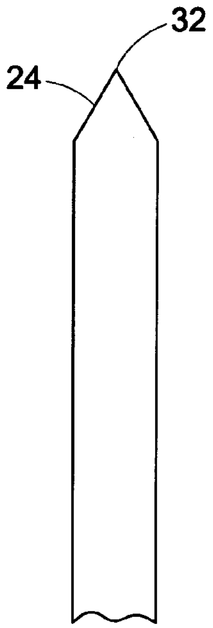
FIG. 2B is atop plan view of a length of tape having a pointed end portion.
Figure 2C:
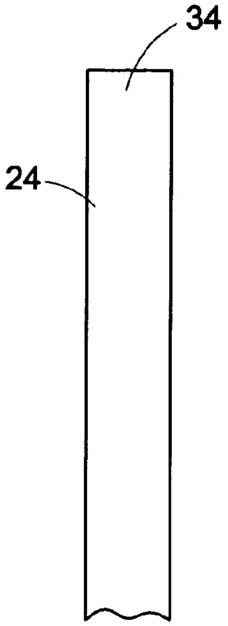
FIG. 2C is atop plan view of a length of tape having a flat end portion.
Figure 2D:
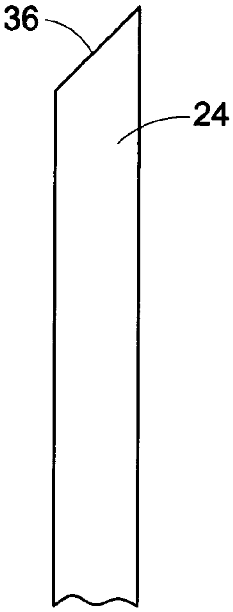
FIG. 2D is atop plan view of a length of tape having a wedge shaped end.
Figure 2E:
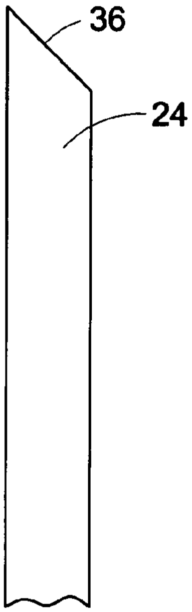
FIG. 2E is atop plan view of a length of tape having a wedge shaped end.

The decorative patterns 18 are created by applying strips 22 of tape 12 to the glass pane 16. In the illustrated embodiment, ends 24 of the tape 12 are cut to mate with ends of other pieces of tape or with edges 26*a–d* of the glass pane 16. The ends 24 of the strips 22 of tape are applied to the glass in close proximity with one another to give the appearance of a continuous bevel. For example, the central ends 28 of the strips that form the decorative pattern 18 illustrated in FIG. 1A are pointed and outer ends 30 are flat or squared off. FIGS. 2A and 2B illustrate pointed tape ends 32 that could be used to create the pattern illustrated by FIG. 1A. FIG. 2C illustrates a squared off end 34. The ends 24 of the strips that form the decorative pattern 18 illustrated in FIG. 1B are wedge shaped. FIGS. 2D and 2E illustrate wedge shaped tape ends 36. A cosmetic defect occurs if there is too large a gap between the ends 24 of the strips 22 of tape or the ends of the tape overlap.

Figure 3:
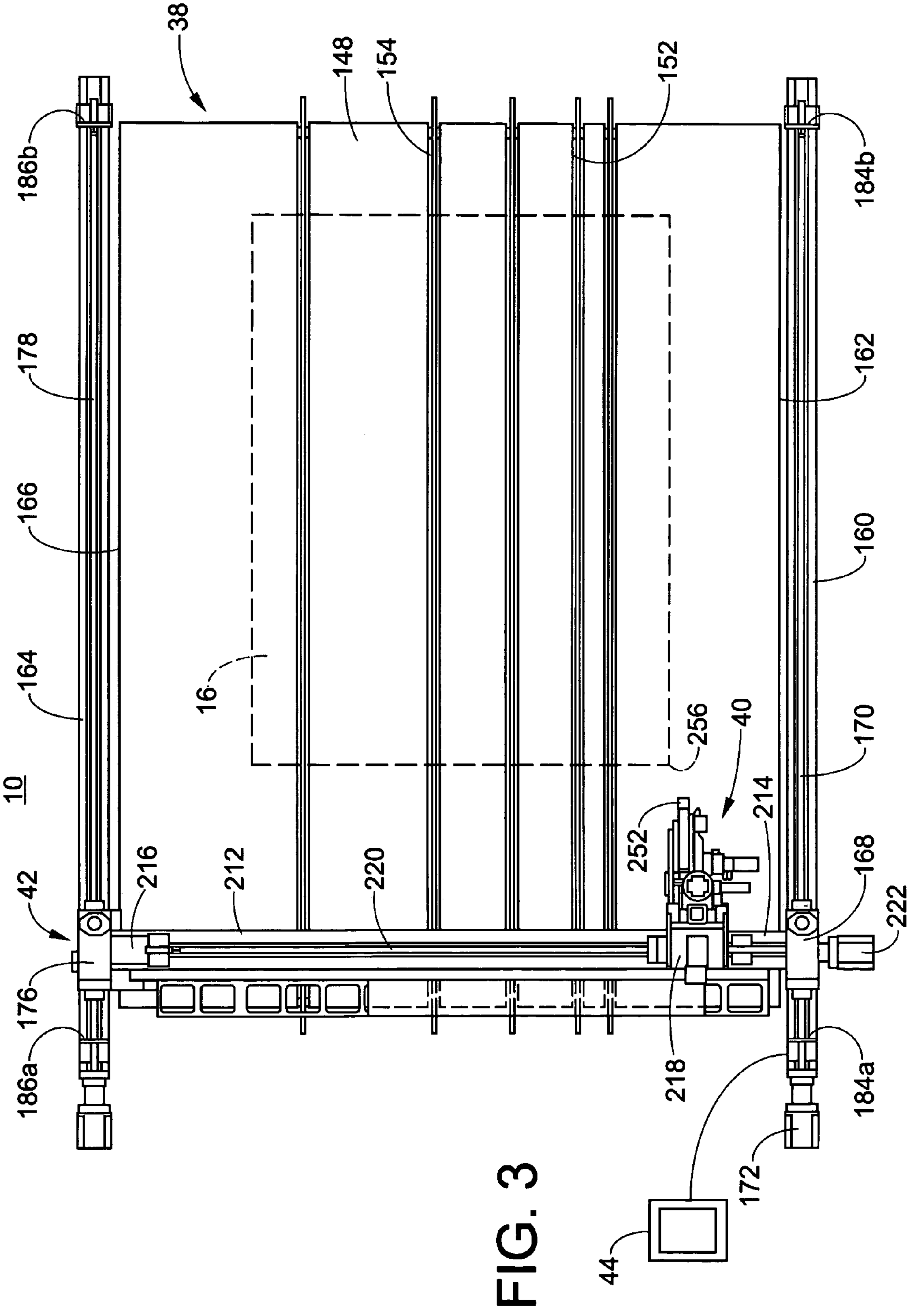
FIG. 3 is a top plan view of a tape application system for applying a decorative tape to a surface of a glass plate.
Figure 4:
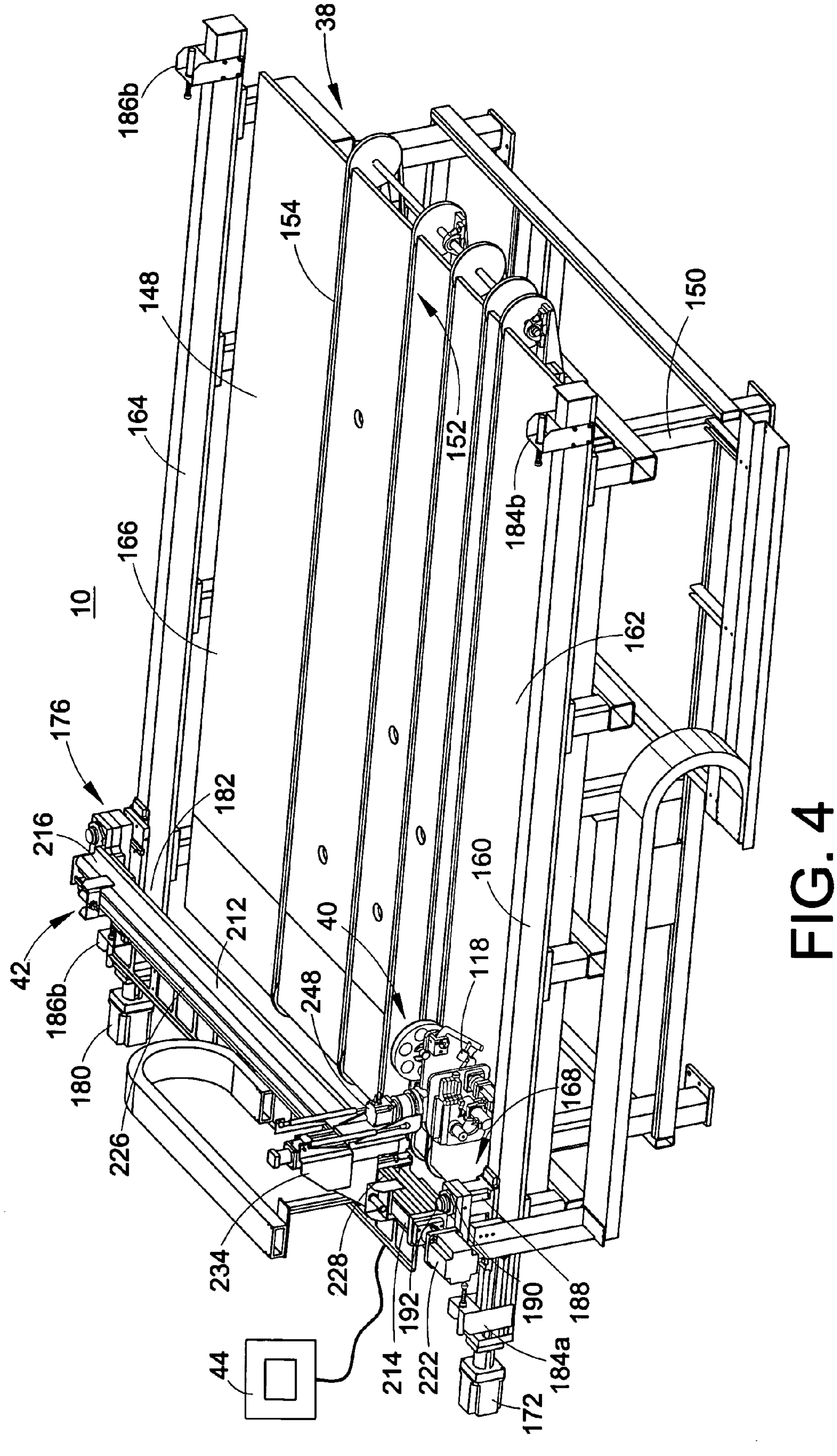
FIG. 4 is an perspective view of a tape application system for applying a decorative tape to a surface of a glass plate.
Figure 5:
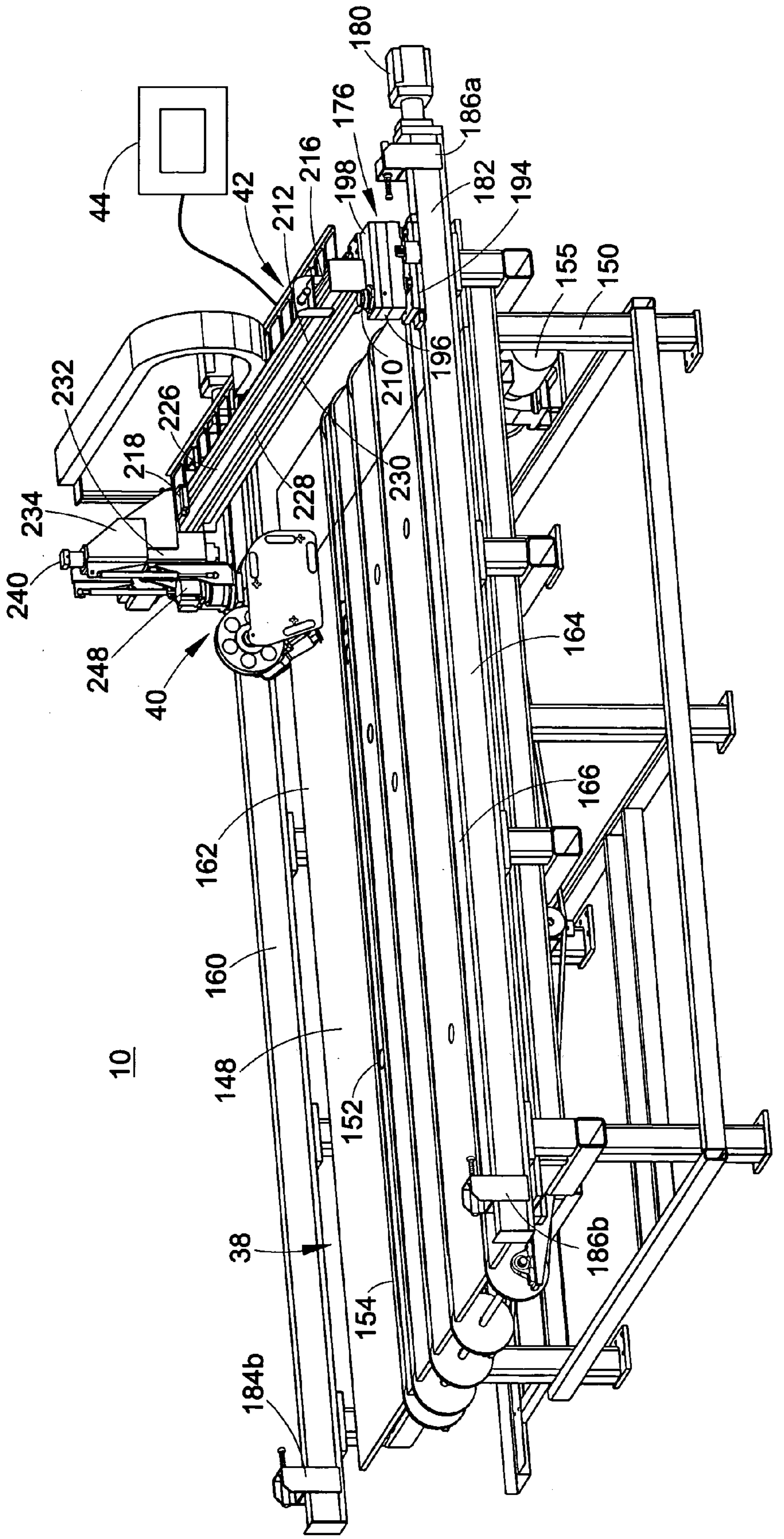
FIG. 5 is a perspective view of a tape application system for applying a decorative tape to a surface of a glass plate.

Referring to FIGS. 3–5, the disclosed tape application system includes a table 38 for supporting one or more glass panes 16 or plates, a tape dispenser 40, a gantry 42 for moving the tape dispenser 40 with respect to the table 38, and a controller 44 for controlling movement of the dispenser 40 and dispensing of the tape.

Dispenser

Figure 6:
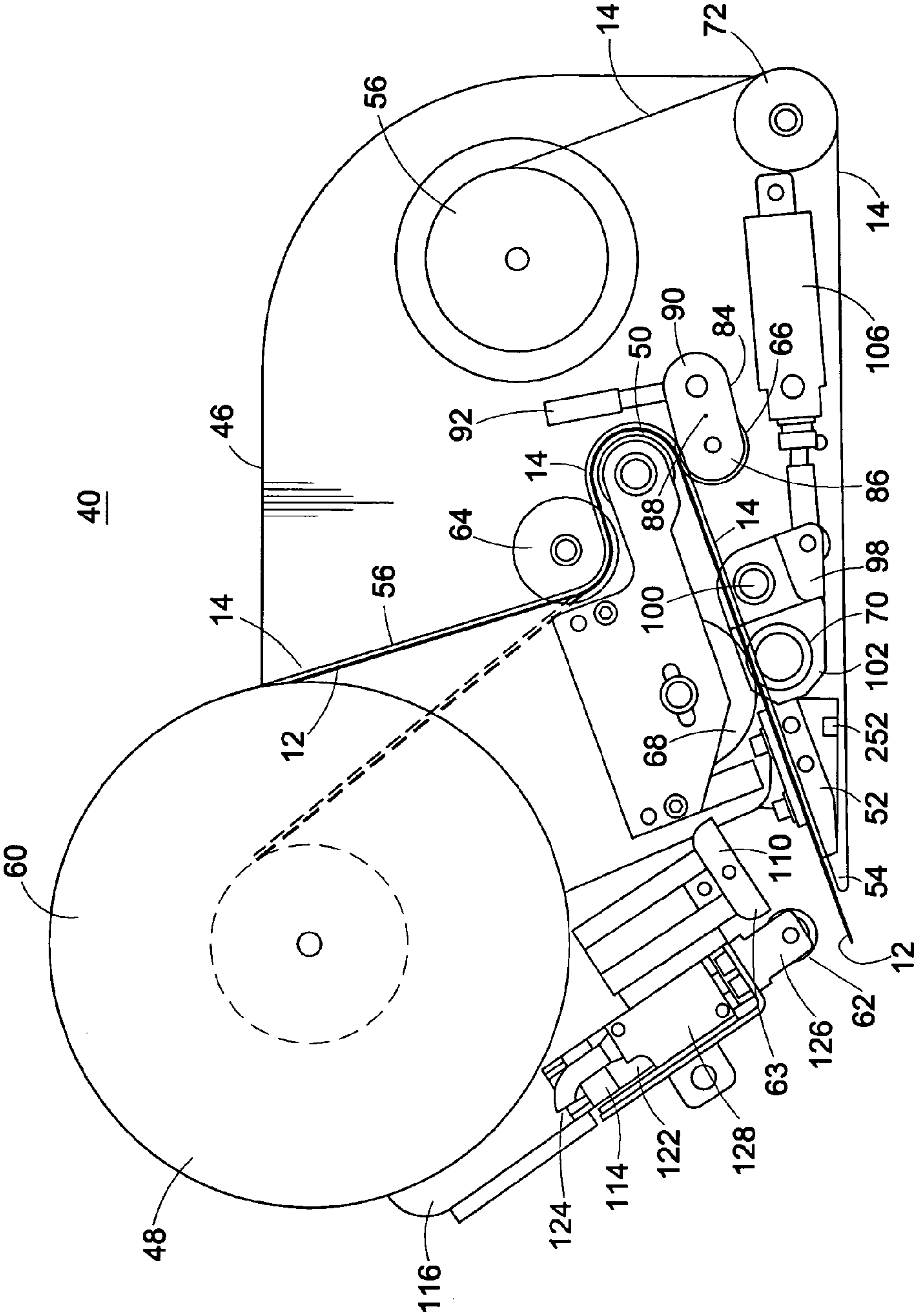
FIG. 6 is a schematic representation of a tape dispenser in accordance with the present invention.
Figure 7:
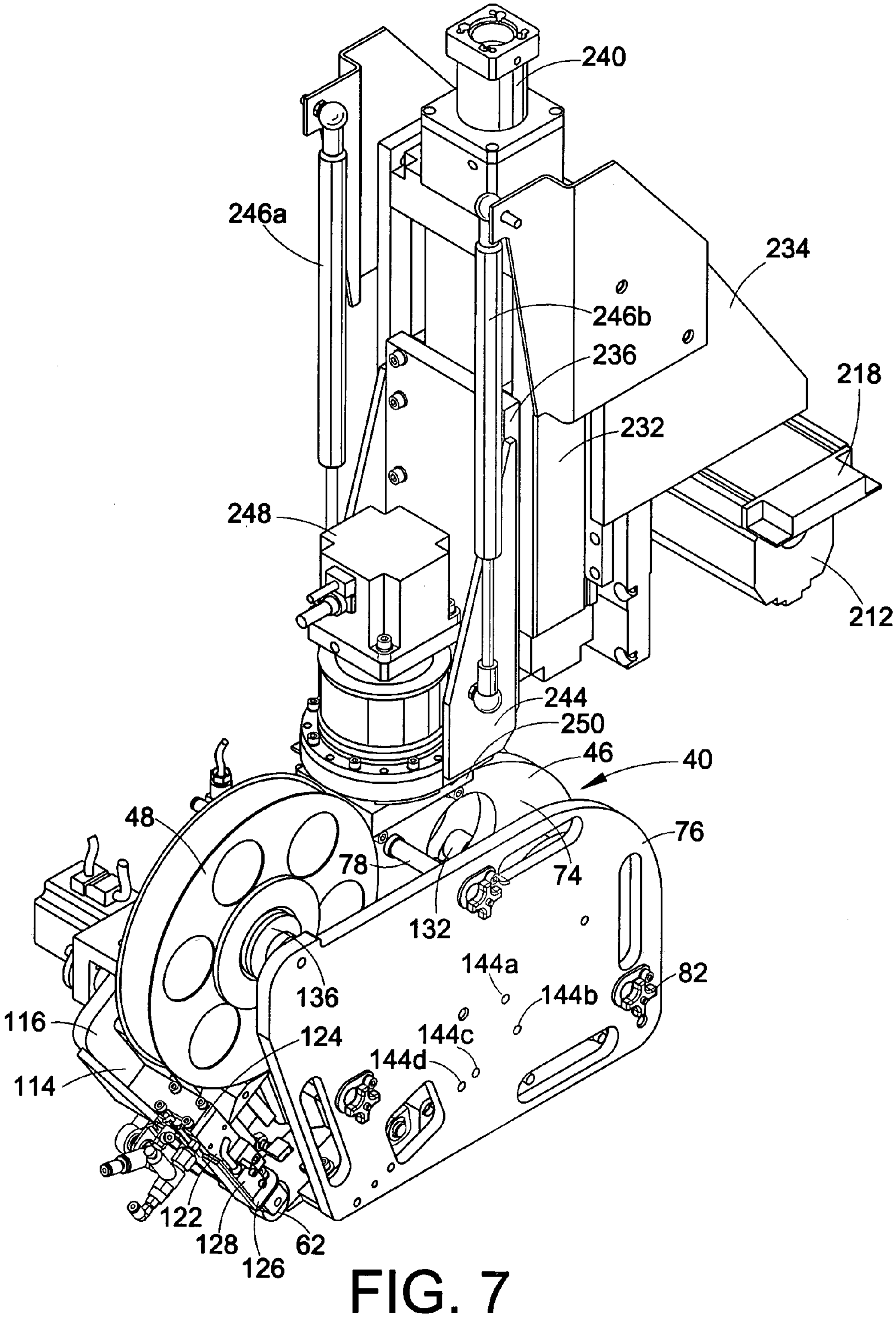
FIGS. 7 and 7A is a perspective view of a tape dispenser mounted to motors that vertically position the dispenser and rotate the dispenser.

Referring to FIGS. 6 and 7, the disclosed tape dispenser 40 includes a frame 46, a tape spool 48, a drive roller 50, a platen 52 having an angular front end portion 54 and a rewind spool 56. The tape spool 48, drive roller 50, platen 52 and rewind spool 54 defining a path of travel 58 from the tape spool 48, around the drive roller 50, around the front end portion 54 of the platen 52, to the rewind spool.

The illustrated dispenser 40 also includes a pressure application roller 62, first and second drive roller idler pulleys 64, 66, a rotary die 68, a rotary die engagement anvil 70, a liner rewind idler pulley 72 and the tape dispenser 40 also includes a chad removal actuator 63 for removing portions of tape 12 from the liner 14. A roll 60 of tape 12 having a liner 14 is carried by the tape spool 48. In the embodiment illustrated by FIG. 6, the tape 12 having the liner 14 extends from the roll of tape 60 around the drive roller 50. The first and second drive roller idler pulleys 64, 66 hold the tape 12 and liner 14 in engagement with the drive roller 50. The tape 12 and liner 14 extend from the drive roller 50 past the rotary die 68. The rotary die engagement anvil 70 or roller selectively pushes the tape 12 into engagement with the rotary die 68. The tape 12 and liner 14 extend from the rotary die 68 to the angular front end portion 54 of the platen 52. At or near the angular front end portion 54 of the platen 52, the tape 12 separates from the liner 14. The tape 12 extends substantially linearly into an area in which the pressure application wheel 62 can selectively engage the tape 12 to press the tape 12 onto the glass pane 16. The liner 14 extends around the angular front end portion 54 of the platen 52, around the liner rewind idler pulley 72 to the liner rewind spool 56. One acceptable rotary die is Glass Equipment Development part number 2-15945. One acceptable anvil is Glass Equipment Development part number 3-16349.

Figure 8:
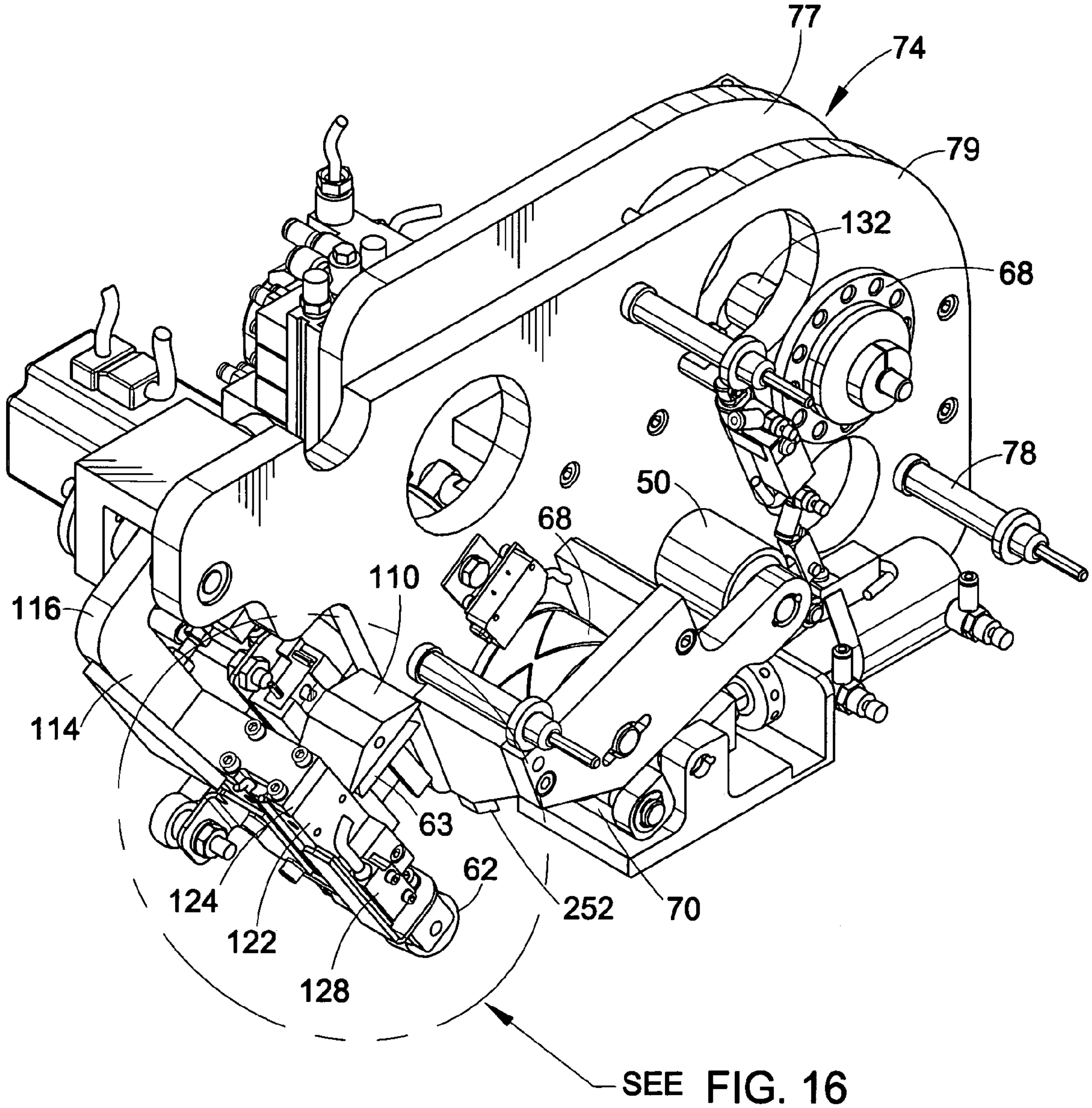
FIG. 8 is a perspective view of a tape dispenser with a tape cassette removed.
Figure 9:
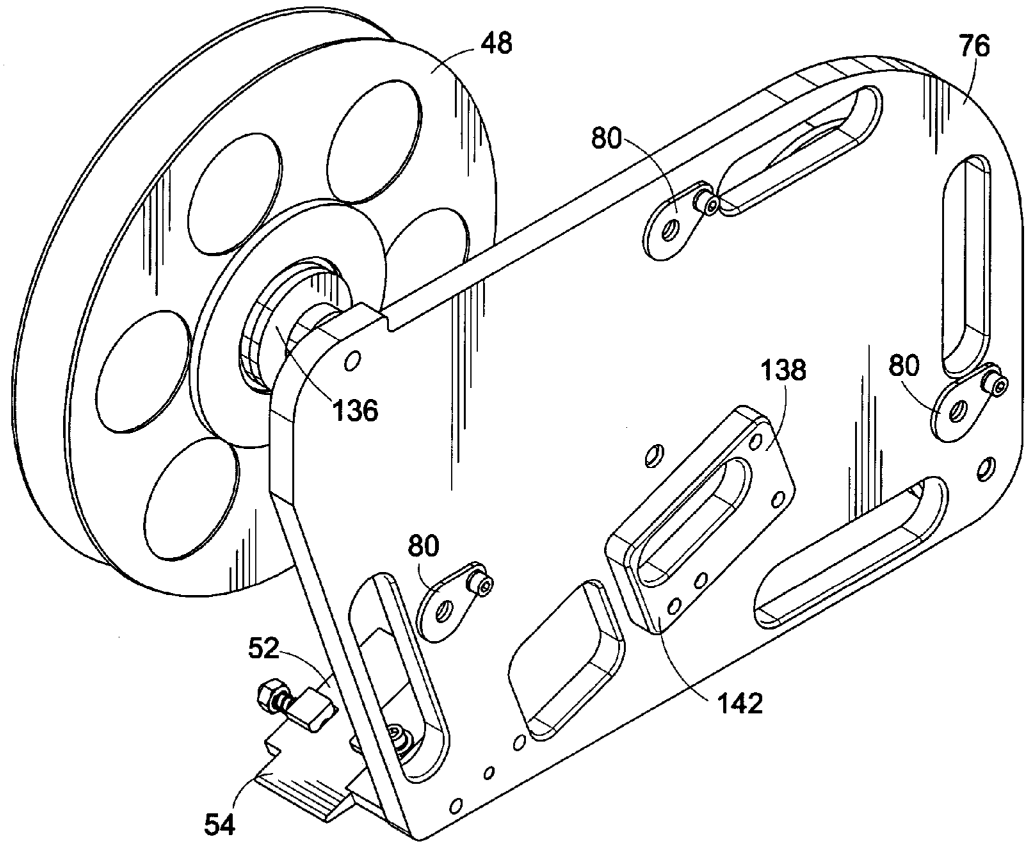
FIG. 9 is a perspective view of a tape cassette for use in a tape dispenser with a routing guide installed in the cassette.
Figure 11:
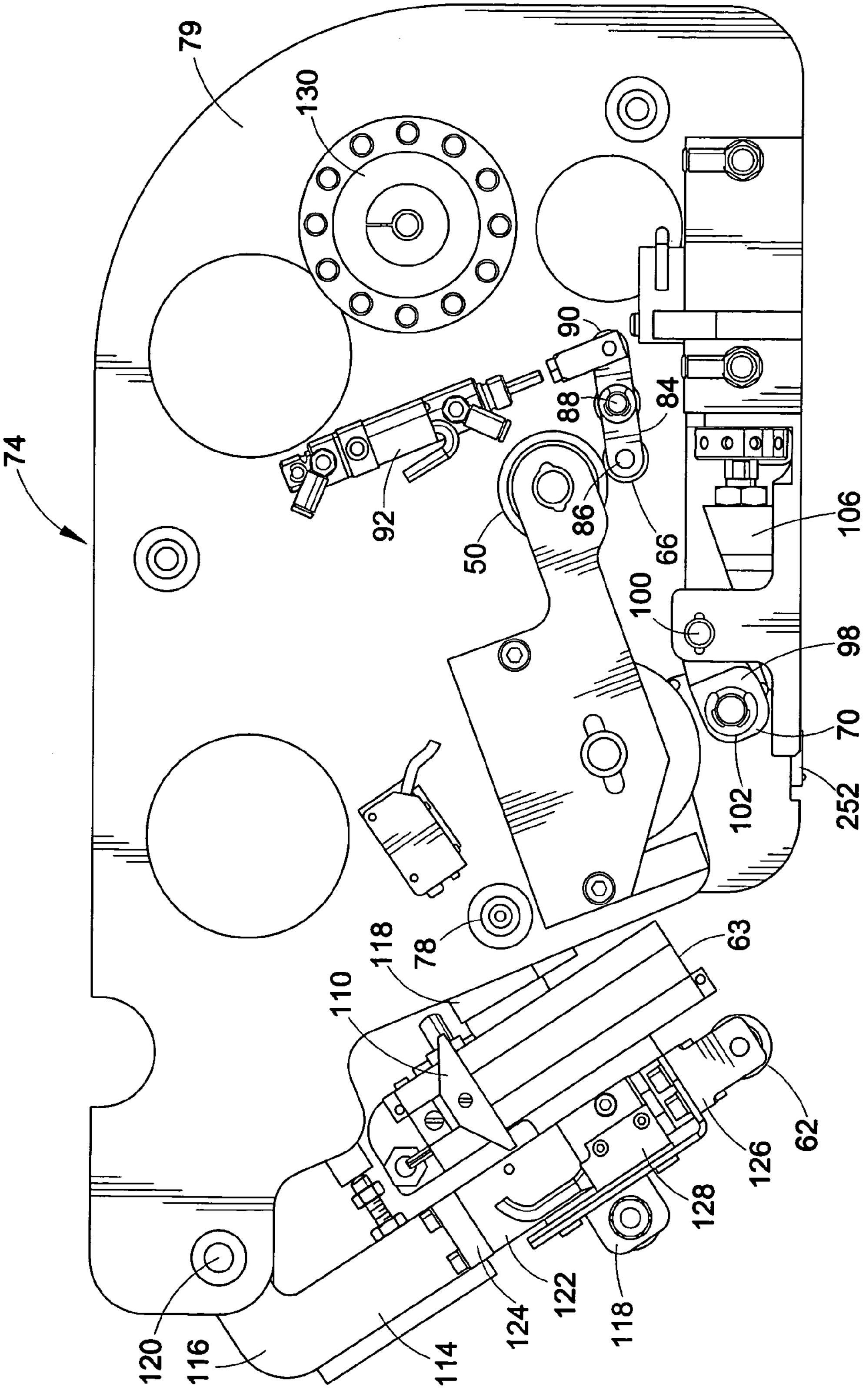
FIG. 11 is a front elevational view of a tape dispenser with a tape cassette removed.

Referring to FIGS. 7, 8 and 9, the illustrated frame 46 includes a base member 74 and a cassette plate 76. The base 74 includes a motor mount plate 77 and an intermediate plate 79. Servo motors that drive the drive roller 50, the rewind spool 56 and the rotary die 68 are mounted to the motor mount plate 77. Referring to FIGS. 8 and 11, the drive roller 50, the pressure application wheel 62, the second drive roller idler pulley 66, the rotary die 68, and the rotary die engagement anvil 70 are mounted on the intermediate plate 79 of the base 74. One acceptable tape drive roller is Glass Equipment Development's part number 3-16206. One acceptable pressure roller is Glass Equipment Development's part number 3-16137.

Figure 12:
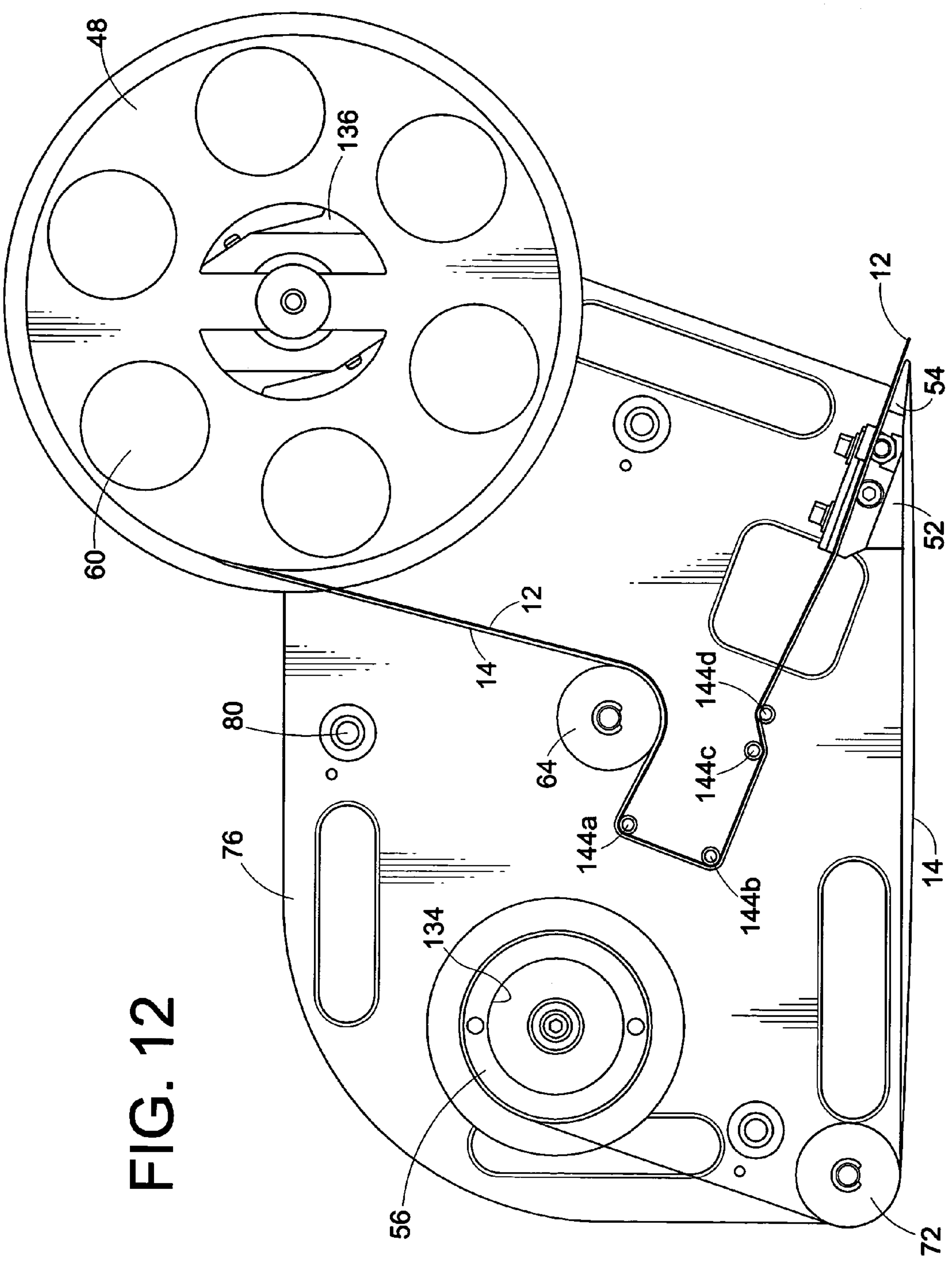
FIG. 12 is a front elevational view of a tape cassette for use with a tape dispenser.

Referring to FIG. 12, the tape spool 48, the platen 52, the liner rewind spool 56, the first drive roller idler pulley 64 and the liner rewind idler pulley 72 are mounted to the cassette plate 76.

Referring to FIGS. 7 and 11, the base member 74 of the illustrated tape dispenser 40 includes standoffs 78 that correspond to mounting holes 80 in the cassette plate 76. The cassette plate 76 is mounted to the base member 74 with nuts 82 (FIGS. 7 and 7A) that hold the cassette plates 76 on the standoffs 78 in the illustrated embodiment. Referring to FIG. 11, the drive roller 50 is rotatably mounted to the base member 74. The drive roller 52 is coupled to a drive roller servo motor (not shown in FIG. 11) that drives the drive roller 50.

Referring to FIG. 11, the second drive roller idler pulley 66 is mounted to the base member 74 by a linkage 84. The second drive roller idler pulley 66 is rotatably mounted on a first end 86 of the linkage 84. The linkage 84 is pivotally mounted to the base member 74 near a middle portion 88 of the linkage 84. A second end portion 90 of the linkage 84 is connected to a drive roller engagement actuator 92 that is mounted to the base member 74 of the frame 46. Movement of the drive roller engagement actuator 92 causes the linkage 84 to move the second drive roller idler pulley 66 into and out of engagement with the drive roller 50. When the idler roller is not engaged, tape loading and unloading is facilitated. One acceptable drive roller engagement actuator 92 is a Bimba #M020.50-DXP pneumatic actuator.

Figure 23A:
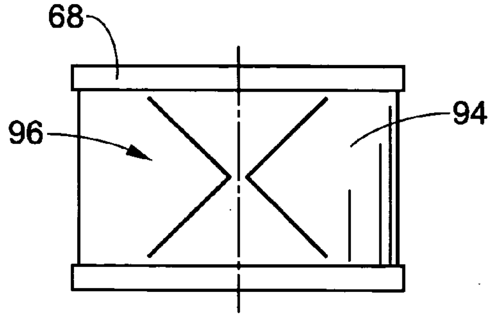
FIGS. 23A–E are illustrations of rotary die patterns on a rotary die.
Figure 23B:
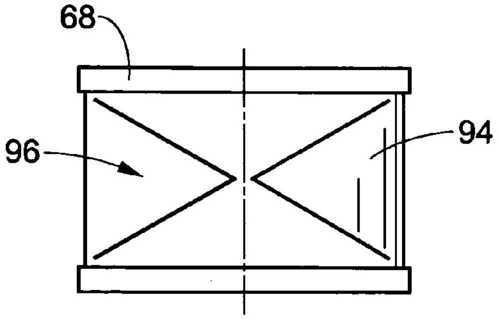
Figure 23C:
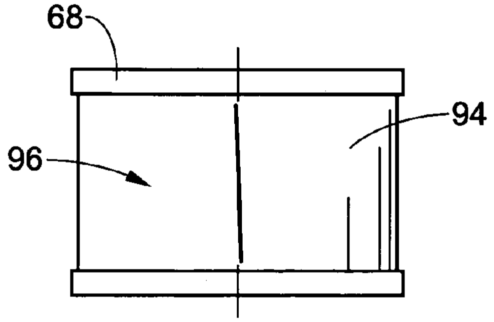
Figure 23D:
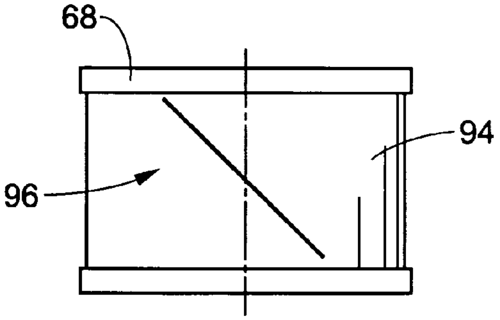
Figure 23E:
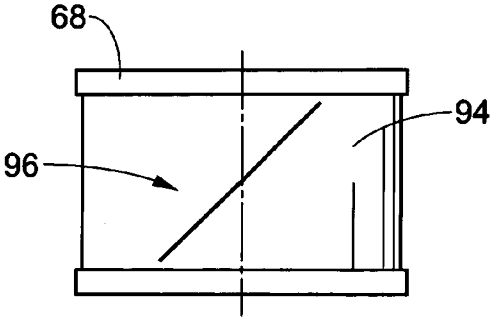
Figure 24:
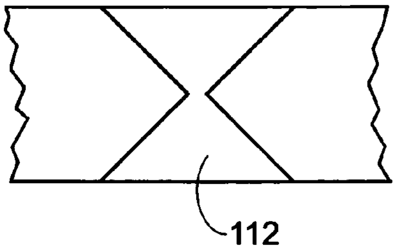
FIG. 24 illustrates ends of two strips of tape separated by a tape chad on a tape liner.

Referring to FIGS. 6, 8 and 11, the rotary die 68 is rotatably mounted to the base 74 of the frame 46. The rotary die 68 is driven by a servo motor 69 (see FIG. 20). One acceptable servo motor 69 is Yaskawa's model number SGMAH-02. Referring to FIGS. 22A–E, the rotary die 68 includes a surface 94 with cutting patterns 96 defined thereon that score the ends of tape strips being dispensed. The cutting edges depicted in FIG. 23A corresponds to the strip end shown in FIG. 2A. The cutting edges depicted in FIG. 23B correspond to the strip end shown in FIG. 2B. The cutting edge depicted in FIG. 23C, corresponds to the strip end depicted in FIG. 2C. The cutting edge depicted in FIG. 23D corresponds to the strip end depicted in FIG. 2D. The cutting edge depicted in FIG. 23E corresponds to the strip end depicted in FIG. 2E. The pattern 96 shown in FIGS. 23A and 23B define bow tie-shaped cutouts or chads 112 on the tape 12 that are removed from the liner 14, which results in two strips 22 of tape 12 having pointed ends 32 (see FIGS. 2A, 2B). In the exemplary embodiment, the chad is removed prior to application onto the glass. FIG. 24 shows a chad 112 on the backing 14 before it is removed. Referring to FIGS. 23D and 23E, the rotary die 68 includes patterns 96 that define wedge-shaped tape ends used in creating a frame pattern 20. Referring to FIG. 23C, the surface 94 of the rotary die 68 also includes a rectangular pattern for creating squared off ends 34.

The rotary die engagement anvil 70 is connected to the base member 74 by a linkage 98. The linkage 98 is pivotally connected to the base member 74 at a pivot point 100. The rotary die engagement anvil 70 is rotatably connected to a first end portion 102 of the linkage 98. The linkage 98 is coupled to an actuator 106. Movement of the actuator 106 causes the rotary die engagement anvil 70 to selectively push the tape 12 into engagement with the rotary die 68. One acceptable actuator 106 is Bimba #M170.75-DQ. In the exemplary embodiment, when the actuator 106 is not engaged it is possible to load the tape cassette.

When a pattern 96 is to be scored into the tape 12 the rotary die 68 is rotated by the servo motor 69 to the beginning of a desired pattern to be scored into the tape 12. When the location on the tape to be scored reaches the rotary die 68, the actuator 106 moves the rotary die engagement anvil 70 to bring the tape 12 into engagement with the rotary die 68. As the tape 12 moves past the rotary die 68, the rotary die 68 is rotated by the servo motor 69 at the same speed as the tape to score the desired pattern 96 into the tape 12. The rotary die engagement anvil 70 is free wheeling and rotates as the tape 12 is scored by the rotary die 68.

Referring to FIG. 6, a chad removal actuator 63 is mounted to the base member 74. The chad removal actuator 63 includes an engagement portion 110 that is extendable and retractable. When the rotary die 68 scores the tape 12 to define a pattern 96, the tape 12 is advanced until the chad 112 is located on the platen 52 below the engagement portion 110 of the chad removal actuator 63. The tape 12 is stopped. The engagement portion 110 is moved into engagement with the chad 112. In the exemplary embodiment, an adhesive is on the engagement portion 110 or the adhesive from a previously removed chad is exposed, causing the chad 112*w* to stick to the engagement portion 110. The end portion 110 of the chad removal actuator 63 is retracted to remove the chad 112 of tape 12 from the lining 14.

Referring to FIG. 8, the pressure application wheel 62 is mounted to the base member 74 by an arm 114. A first end 116 of the arm 114 is pivotally connected to the base member 74. An actuator 118 (FIG. 4) is connected to the arm 114 and the base 74. Movement of the actuator 118 causes the arm to move about pivot point 120 (FIG. 11). One acceptable actuator 118 is SMC #NCDG-CN25-0100-B54L pneumatic actuator.

An engagement actuator 122 is connected to a second end 124 of the arm 114. The pressure application wheel 62 is rotatably connected to an end 126 of the engagement actuator 122. The engagement actuator 122 moves the pressure application wheel 62 with respect to the frame 46 of the tape dispenser 40 to press tape 12 onto a glass pane 16. A linear position sensor 128 is coupled to the engagement actuator 122. A signal from the linear position sensor 128 is used to position the tape dispenser 40 vertically with respect to the glass pane 16. One acceptable engagement actuator 122 is SMC #MXH16-30-A93L pneumatic actuator.

Referring to FIGS. 8 and 11, a rewind drive hub 130 is rotatably mounted to the base member 74. The rewind drive hub 130 is coupled to a DC motor 132 by a slip clutch (not shown). The rewind drive hub 130 is sized to fit within circular cavity 134 in the rewind spool 56 (see FIG. 12). The rewind drive hub 130 drives the rewind spool 56. The DC motor 132 winds the liner 14 onto the rewind spool 56 and keeps the liner 14 taught. One acceptable motor 132 is a 24 v DC motor.

Referring to FIGS. 9 and 12, the tape spool 48, the first drive roller idler pulley 64, the platen 52, the linear rewind idler pulley 72 and the rewind spool 56 are mounted to the cassette plate 76. These components mounted on the cassette plate are referred to as a cassette assembly 75. The tape spool 48 is mounted to the cassette plate 76 with a slip clutch tensioner 136. The slip clutch tensioner 136 keeps the tape 12 and liner 14 taught between the tape spool 40 and the drive roller 50. The first drive roller idler pulley 64 is mounted to the cassette plate 76, such that the first drive roller pulley 64 can rotate freely. The platen 52 is fixed to the cassette plate 76. The linear rewind idler pulley 72 is connected to the cassette plate 76, such that it may freely rotate. The rewind spool 56 is connected to the cassette plate 76, such that the rewind spool 56 can freely rotate.

Figure 10:
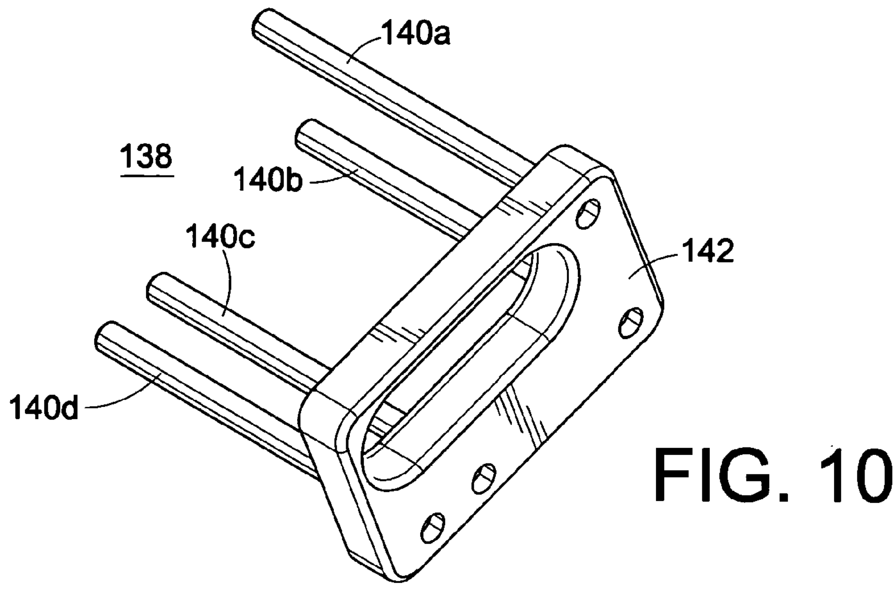
FIG. 10 is a perspective view of a routing guide for use with a tape cassette.

Referring to FIGS. 9, 10 and 12, a routing guide 138 is used with the cassette assembly 75 to position the tape 12 and liner 14 around the drive roller 50 as the cassette 75 is assembled onto the base 74. The routing guide 138 includes four guide pins 140*a–d* connected to a mounting block 142. The four pins 140*a–d* correspond to four holes 144*a–d* in the cassette plate 76.

Referring to FIG. 12, the tape 12 and liner 14 on the cassette 75 are routed from the roll 60 of tape 12 on the tap spool 48 around the first drive roller idler pulley 64. The tape 12 and liner 14 are routed from the first drive roller idler pulley 64 around the guide pins 140*a–d*. The tape 12 and liner 14 are routed from the routing pin 140*d* to the angular front end portion 54 of the platen 52. The tape 12 separates from the liner 14 at or near the angular front end portion 54 of the platen 52. The liner 14 is routed around the angular front end portion 54 of the platen 52 to the liner rewind idler pulley 72. The liner 14 is routed from the liner rewind idler pulley 72 onto the rewind spool 56.

Referring to FIGS. 6 and 11, the drive roller engagement actuator 92 and rotary die actuator 106 are retracted before the cassette 75 is assembled to the base member 74 to load the tape 12 and liner 14 onto the tape dispenser 40. Retracting the drive roller engagement actuator 92 moves the first drive roller idler pulley 64 away from the drive roller 50, allowing the tape 12 and liner 14 to be positioned between the drive roller 50 and the idler pulley 64. Retracting the rotary die engagement actuator 106 creates a space between the rotary die 68 and the rotary die engagement anvil 70 for the tape 12 and liner 14 to be positioned. The mounting holes 80 in the cassette 75 are aligned with the standoffs 78 in the base 74. The cassette plate 76 is then fastened to the standoffs 78 with the nuts 82. The rewind drive hub 130 on the base members 74 engages the rewind spool 56. The tape 12 and liner 14 is positioned around the drive roller 50 and between the rotary die engagement anvil 70 by the pins 140*a–d* of the routing guide 138. The routing guide 138 is removed from the cassette 75. The liner 14 and tape 12 becomes disposed around the drive roller 50. The drive roller engagement actuator 92 is extended to cause the second drive roller idler pulley 66 to move the tape 12 and liner 14 into contact with the drive roller 50. In the illustrated embodiment, the tape 12 and liner 14 are sandwiched between the drive roller 50 and the second drive roller idler pulley 66 when the drive roller engagement actuator 92 is extended. Slippage between the tape 12 and the drive roller 50 is inhibited by engaging the tape 12 and liner 14 between the drive roller 50 and second drive roller idler pulley 66.

During operation of the tape dispenser 40, the drive roller 50 pulls tape 12 and liner 14 off the roll 60 on the tape spool 48 and feeds the tape 12 and liner 14 to the platen 52. The length of tape 12 and liner 14 provided by the drive roller 50 is monitored by monitoring operation of the servo motor 53 that drives the drive roller 50 and a signal provided by an encoder 146 (FIG. 20) that is coupled to the drive roller 50. The DC motor 132 coupled to the rewind hub 130 causes the rewind spool 56 to rewind the liner 14. The DC motor 132 keeps the liner 14 between the platen 52 and the rewind spool 56 taught and the tape 12 and liner 14 between the drive roller 50 and the platen 52 taught. The engagement actuator 122 moves the pressure roller 62 into engagement with the tape 12 and presses the tape 12 onto a glass pane 16.

The tape dispenser 40 cuts the tape 12 into strips 22 that are applied to the glass pane 16. The rotary die 68 is rotated to the pattern 96 associated with the tape end 24 associated with a strip being applied. The rotary die engagement actuator 106 is extended to move the rotary die engagement anvil 70 to bring the tape 12 corresponding to an end 24 of a strip 22 being formed into engagement with the rotary die 68. The drive roller 50 advances the tape 12 and liner 14 while the rotary die 68 rotates to cut the desired pattern 96 into the tape 12 to create the ends of the tape strip. At this point, the strips 22 of tape to be applied to the glass pane 16 and a chad of tape 112 defined by the cut of the rotary die 68 that is not to be applied to the glass pane 16 are on the liner 14. After the rotary die 68 scores the desired pattern 96 into the tape 12, the rotary die engagement actuator 106 moves the rotary die engagement pulley 70 away from the rotary die. When the rotary die engagement pulley 70 is spaced apart from the rotary die 68, the tape 12 and the liner 14 pass the rotary die 68 without being engaged by the rotary die 68.

The tape 12 and liner 14 are moved to position the chad on the platen 52 beneath the chad actuator 108. The chad actuator 108 is extended to engage the chad 112 on the liner 14 and retracted to remove the chad 112 from the liner 14. In the exemplary embodiment, several chads of tape 112 are removed from the liner 14 with the chad actuator 108 before the chads 112 have to be removed from the end portion 110 of the chad actuator 108.

If the rotary die 68 cuts a relatively large pattern 96 in the tape 12, a portion of the chad 112 could possibly reach the pressure application roller 62 before the chad of tape 112 is removed by the chad actuator 108. In the illustrated embodiment, the actuator 118 pivots the arm 114 away from the dispenser frame 46 to prevent the pressure application wheel 62 from pressing the chad of tape 112 onto the glass pane 16. The actuator 118 moves the arm 114 back to its original position after the chad of tape 112 is removed from the liner 14. In the exemplary embodiment, to prevent the leading chad points from contacting the glass, the dispenser is moved upward with respect to the glass pane a pre-determined amount prior to the chad points leaving the platen tip.

Referring again to FIGS. 3–5, the tape dispenser 40 is mounted above the table 38 for supporting one or more glass panes. The table includes a top 148 supported by a plurality of legs 150. In the illustrated embodiment, a plurality of slots 152 are included in the table top 148. A series of conveyors 154 are disposed in the slots 152 in the table. The conveyors are driven by an AC motor 155 (FIG. 5). The conveyors 154 move a glass plate 16 placed at a first end of the table 38 toward a second end 158 of the table. In the exemplary embodiment, the glass pane 16 need not be aligned on the table top 148.

In the exemplary embodiment, vacuum cups (not shown) are included on the table top for holding the glass to the table. Acceptable vacuum cups are Anver number A-3150 078P vacuum cups. The vacuum cups are powered by a vacuum generator. One acceptable vacuum generator is Anver #JE30HDSE.

In the illustrated embodiment, the tape dispenser 40 is mounted above the table 38 by the gantry 42. In the illustrated embodiment, the gantry 42 is connected to the table 38. The gantry 42 includes a rail 160 mounted to a first side 162 of the table top 148 and a second rail 164 mounted to the second side 166 of the table top 38. A first carriage 168 is slidably mounted to the first rail 160. A first ball screw 170 (shown in FIG. 3) is mounted within the first rail 160. The first ball screw 170 is coupled to the first carriage 168. A servo motor 172 is mounted to a first end 174 of the first rail 160. The servo motor 172 is coupled to the first ball screw 170. Actuation of the first servo motor 172 causes rotation of the first ball screw 170 which moves the first carriage 168 along the first rail 160. The rail 160, ball screw 170 and carriage 168 may be purchased as a unit. For example, Star Linear's # MKK25-110 ball screw actuator includes a rail, ball screw and carriage base that may be used in accordance with the present invention. One acceptable first motor 172 is Yaskawa's model number SGMGH-09.

A second carriage 176 is slidably mounted to the second rail 164 of the gantry 42. A second ball screw 178 (illustrated in FIG. 3) is mounted within the second rail 164. A second servo motor 180 is mounted to a first end 182 of the second rail. The second ball screw is coupled to the servo motor 180. Actuation of the servo motor 180 causes rotation of the second ball screw 178 which moves the second carriage 176 along the second rail 164 of the gantry 42. The first and second servo motors 172, 180 are connected to the controller 44, which controls actuation of the motors 172, 180 to move the carriages 168, 176 along the gantry 42 rails 160, 164. In the exemplary embodiment, the actuation of the motors 172, 180 is synchronized to move the carriages 168, 172 along the rails 160, 164 in unison. The rail 164, ball screw 178 and carriage 176 may be purchased as a unit. For example, Star Linear's # MKK25-110 ball screw actuator includes a rail, ball screw and carriage base that may be used in accordance with the present invention. One acceptable second motor 180 is Yaskawa's model number SGMGH-09.

The first rail 160 includes first and second stops 184*a*, 184*b*. The first and second stops 184*a*, 184*b* are mounted near ends of the first rail 160 to prevent the first carriage from moving off the first rail. Similarly, stops 186*a*, 186*b* are mounted to the second rail 164 to prevent the second carriage 176 from moving off the second rail.

Referring to FIG. 4, the first carriage 168 includes a base 188 and a top plate 190. The base 188 is slidably mounted to the first rail 160 and is coupled to the first ball screw 170. The top plate 190 is connected to the base 188 by a pivotable connection 192 that allows the top plate 190 to rotate about the pivotable connection 192 with respect to the base 188.

Figure 19:
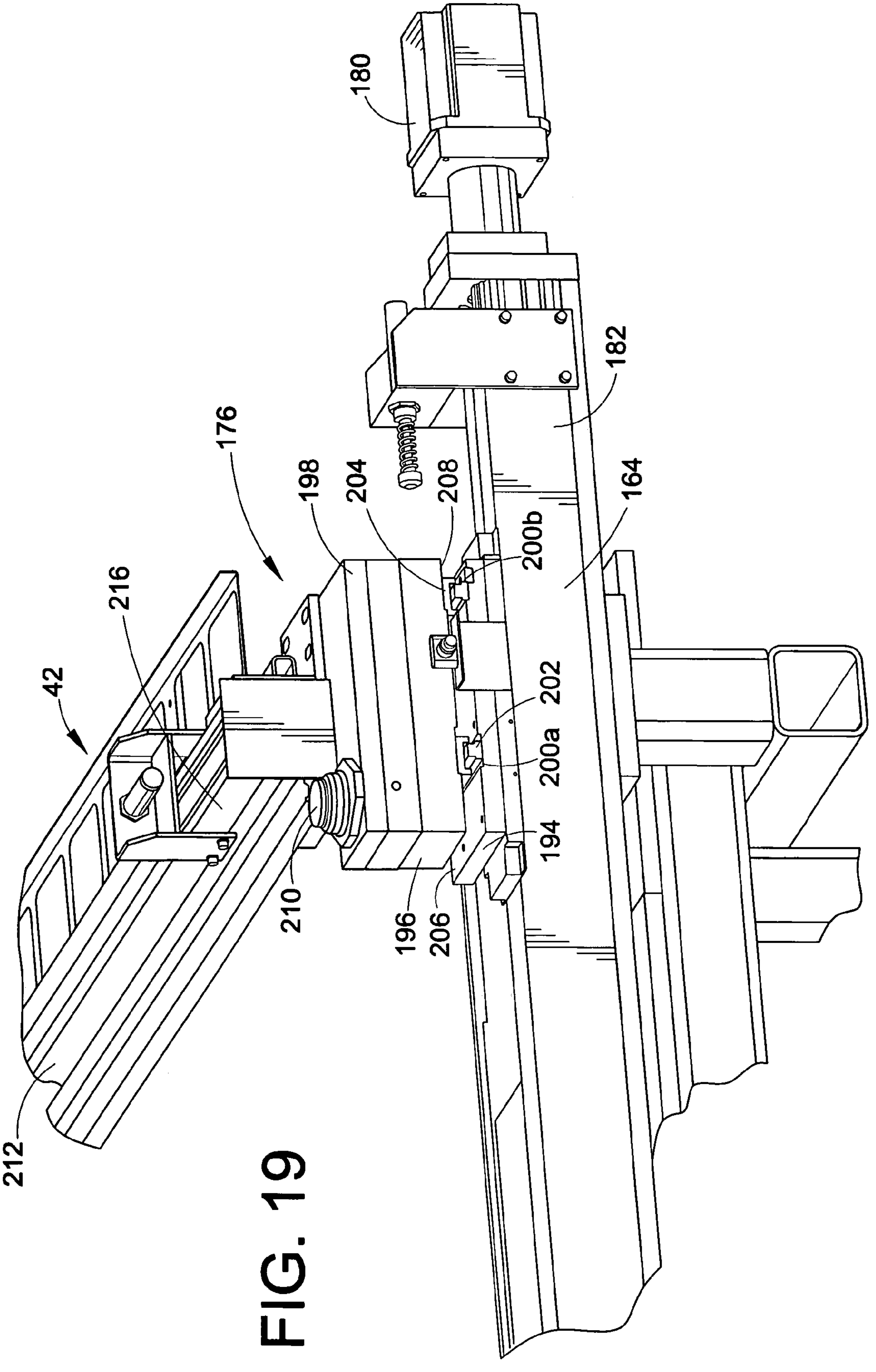
FIG. 19 is a partial perspective view showing a connection of an end of a rail of a gantry to a carriage of a gantry.

Referring to FIG. 19, the second carriage 176 includes a base 194 an intermediate plate 196 and a top plate 198. The base 194 is slidably connected to the second rail 164 and is coupled to the second servo motor 180 by the second ball screw. First and second linear bearings 200*a*, 200*b* each include a rail portion 202 and a channel portion 204 slidably connected to the rail portion. In the embodiment illustrated by FIG. 19, the rail portion 202 of each linear bearing 200*a*, 200*b* is connected to a top surface 206 of the base 194 of the second carriage. The channel portion 204 of each linear bearing 200*a*, 200*b* is connected to a bottom surface 208 of the intermediate plate to slidably connect the intermediate plate 196 to the base 194. The intermediate plate is free to move transversely with respect to the base 194. The top plate 198 is connected to the intermediate plate 196 by a pivotable connection 210 that allows the top plate to rotate with respect to the intermediate plate 196.

Referring to FIGS. 3, 4 and 5, the gantry 42 includes a third rail 212 that extends between the first and second carriages. The third rail 212 includes a first end 214 that is fixed to the top plate 190 of the first carriage and a second end 216 that is fixed to the top plate 198 of the second carriage. A dispenser carriage 218 is slidably connected to the third rail 212. A third ball screw 220 (shown in FIG. 3) is rotatably mounted within the third rail 212. A third servo motor 222 is mounted to a first end 224 of the third rail 212. The third servo motor 222 is coupled to the third ball screw 220. Actuation of the third servo motor 222 causes rotation of the third ball screw 220 which moves the dispenser carriage 218 along the third rail 212. The rail 212, ball screw 220 and carriage 218 may be purchased as a unit. For example, Star Linear's # MKK25-110 ball screw actuator includes a rail, ball screw and carriage base that may be used in accordance with the present invention. One acceptable third motor 222 is Yaskawa's model number SGMGH-09.

Figure 18:
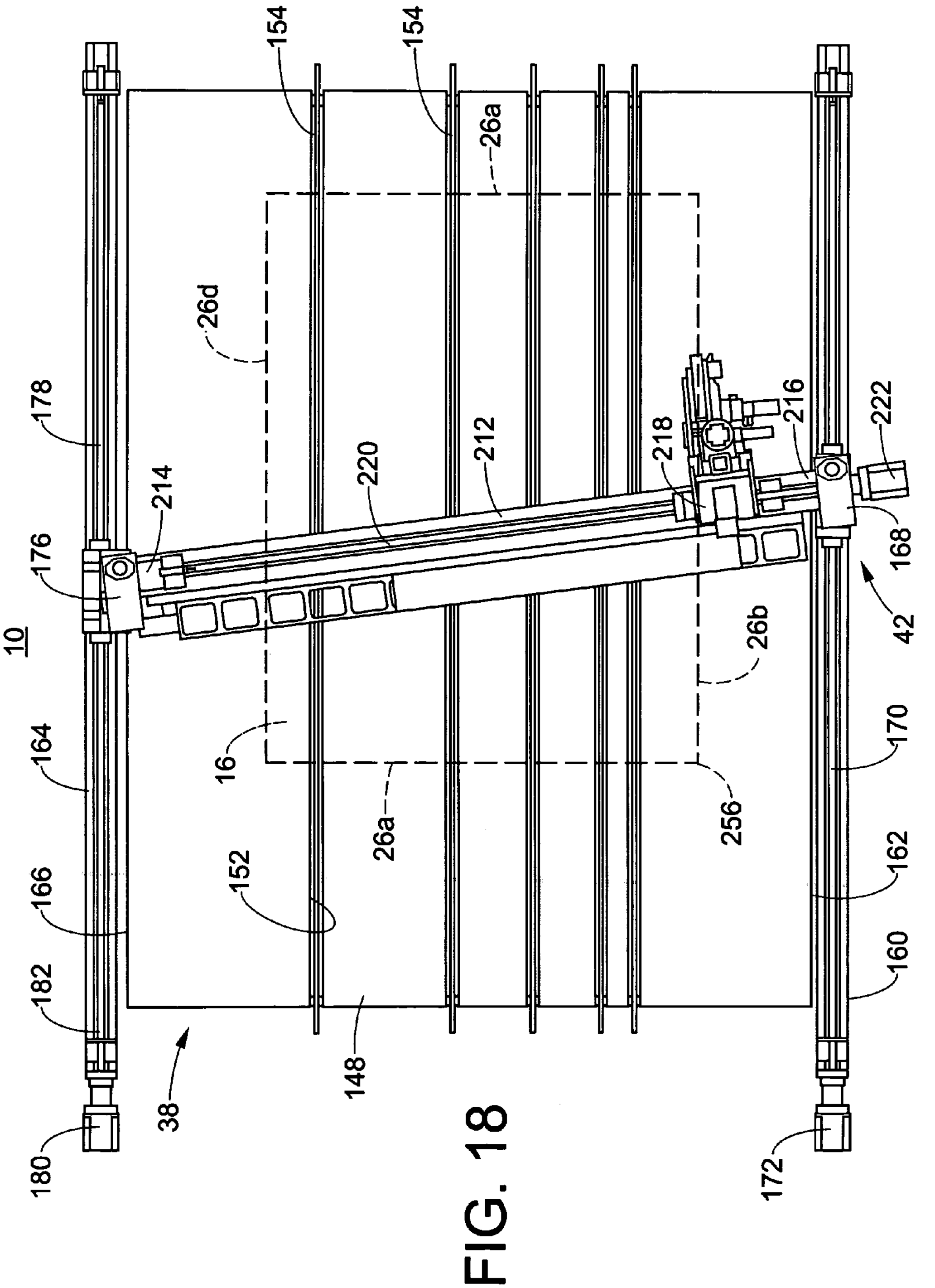
FIG. 18 is a top plan view of a tape application system for applying a decorative tape to a surface of a glass plate.

Referring to FIGS. 18 and 19, in the illustrated embodiment, the first and second carriages 168, 176 of the gantry 42 are moved independently by servo motors 172, 180. In the event that one of the first and second carriages 168, 176 binds up on one of the side rails 160, 164 of the gantry 42, the third rail 212 pivots with the top plates 190, 198 of the first and second carriages 168, 176 to prevent damage to the gantry 42. Referring to FIGS. 4, 18 and 19, when one end of the gantry 42 stops as a result of the binding and the second end of the gantry 42 continues to move along the rail, the third rail 212 and top plate 190 of the first carriage 168 rotate with respect to the base of the first carriage 168. The third rail 212 and the top plate 198 of the second carriage 176 rotate with respect to the base 194 of the second carriage 176. In addition, the intermediate plate 196, top plate 198 and end 216 of the third rail 212 move along the linear bearings 200*a*, 200*b* toward the first rail. The pivotal connection between the first rail and the third rail 212 and the pivotal and slidable connection between the second rail and the second end of the third rail 212 allows the third rail 212 of the gantry to rotate if one of the carriages 168, 176 of the gantry 42 binds up, preventing damage to the gantry 42.

Figure 7A:
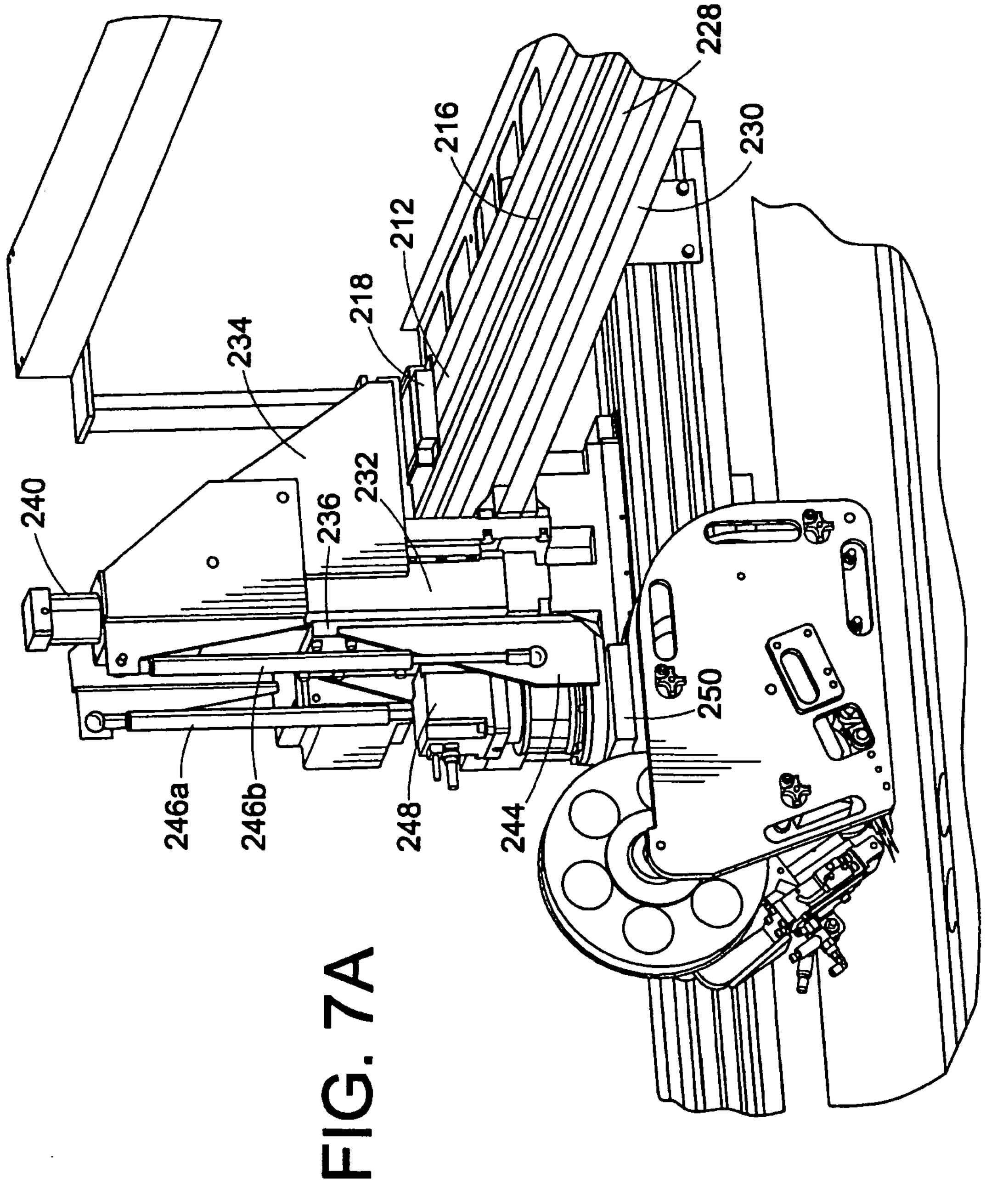

Referring to FIGS. 7 and 7A, the third rail 212 includes an upper portion 226 and a side portion 228 that includes an additional guide 230 or support. The dispenser carriage 218 is slidably mounted to the upper portion 226 of the third rail 212. A vertical rail 232 is connected to the dispenser carriage 218 by brackets 234. The vertical rail 232 is slidably connected to the guide 230. The vertical rail 232 and dispenser carriage 218 slide as a unit along the third rail 212 when the third ball screw 220 is driven by the third servo motor 222. The guide 230 stabilizes the vertical rail 32 and dispenser carriage 218 on the third rail 212.

Referring to FIGS. 7 and 7A, a vertical carriage 236 is slidably mounted to the vertical rail 232. A vertical ball screw 238 (not shown in FIGS. 7 and 7A) extends within the vertical rail 232. A vertical motor 240 is mounted to the top of the vertical rail 232. The vertical motor 240 is coupled to the vertical ball screw 238. Actuation of the vertical motor 240 causes rotation of the vertical ball screw 238 which moves the vertical carriage 236 along the vertical rail 232. The vertical rail 232, vertical ball screw 238 and vertical carriage 236 may be purchased as a unit. For example, Star Linear's # CKK-20-145 ball screw actuator includes a rail, ball screw and carriage base that may be used in accordance with the present invention. One acceptable motor 172 is Yaskawa's model number SGMAH-01.

Referring to FIG. 6, the vertical carriage 236 includes an L bracket 244. First and second gas springs 246*a*, 246*b* are connected at one end to the L bracket 244 and at one end and to brackets 234 connected to the vertical rail 232. The gas springs 246*a*, 246*b* provide an upward force on the tape dispenser 40 to counterbalance the weight of the tape dispenser. The gas springs 246*a*, 246*b* reduce the amount of load carried by the vertical motor 240. The vertical motor pushes the dispenser 40 down against the force supplied by the gas springs 246*a*, 246*b* and pulls the dispenser 40 up with the assistance with the gas springs 246*a*, 246*b*. The gas springs 246*a*, 246*b* prevent the dispenser 40 from descending when power to the vertical motor 240 is lost.

Referring to FIGS. 7 and 7A, a rotary motor 248 is connected to the L bracket 244 of the vertical carriage 236. The rotary motor 248 is selectively actuated to the controller 44. The rotary motor 248 is coupled to a mounting plate 250 that carries the tape dispenser 40. The controller 44 provides signals to the rotary motor 248 that caused the rotary motor to rotate the tape dispenser 40. One acceptable rotary motor is Yaskawa's model number SGMPH-02.

Referring to FIG. 11, the illustrated system includes an optical sensor 252 that is connected to the dispenser carriage 218. In the illustrated embodiment, the optical sensor 252 is mounted on the motor plate 79 of the tape dispenser 40. The optical sensor 252 senses edges of the glass pane 16 and provides an output to the controller 44. The output of the optical sensor 252 is used to calculate the location and orientation of the glass pane 16. One acceptable optical sensor 252 is a Keyence #FU-38 sensor.

Figure 17:
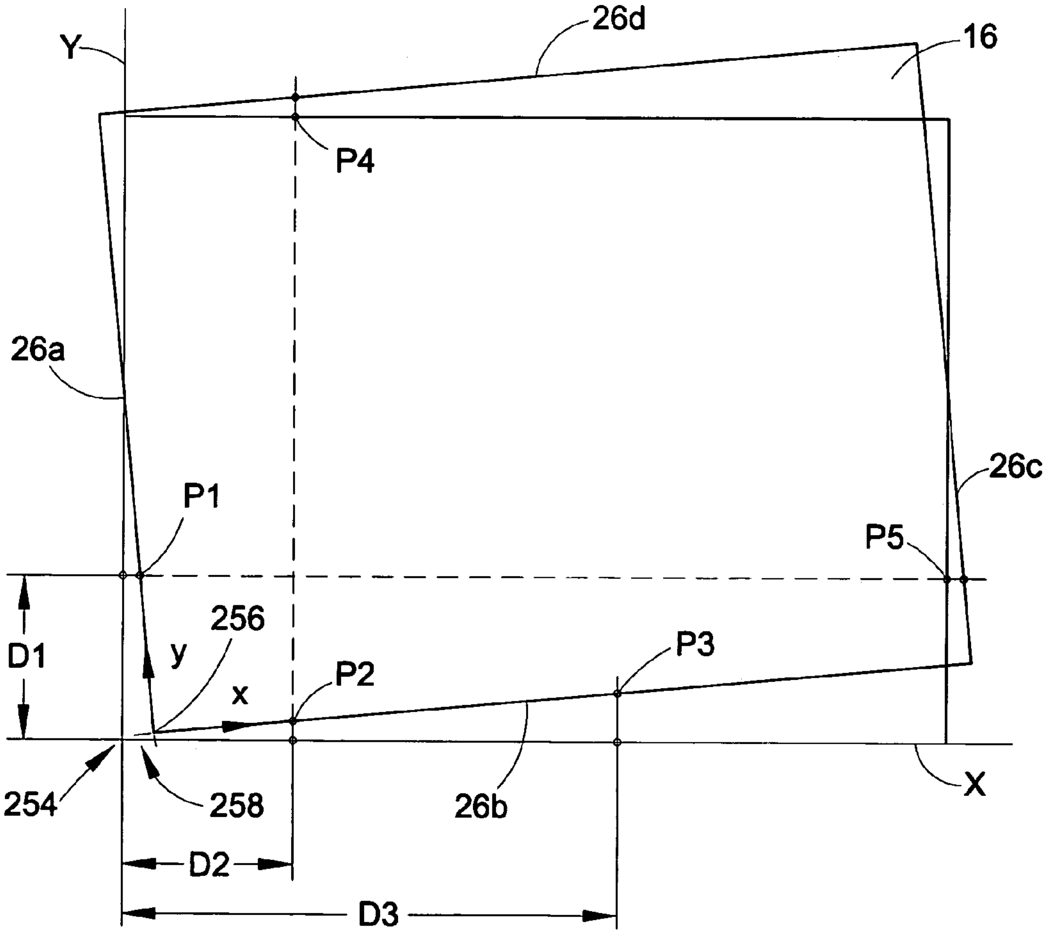
FIG. 17 is a top plan view of a rectangular glass pane arbitrarily oriented with respect to a coordinate system.

Referring to FIG. 17, the system 10 has a known home coordinate system 254 having an X axis and a Y axis. In the exemplary embodiment, glass panes are placed on the table 38 and moved into position by the conveyors 154. Typically, a corner 256 of the glass pane 16 is not aligned with the home coordinate system 254. The optical sensor 252 is used to determine the actual coordinate system 258 of the glass pane 16 that corresponds to the corner 256 of the glass pane. The optical sensor 252 is moved across the pane of glass 16 to locate points along edges 26*a*–*d* of the glass pane 16. The detected points along the edges of the glass pane 16 can be used to determine the location and orientation of the actual coordinate system 258 that corresponds to a corner 256 of the glass pane 16, as well as the size of the glass pane 16.

For example, the optical sensor 252 is moved along the Y axis of the home coordinate system 254 a given distance D1. The optical sensor 252 is then moved in the X direction of the home coordinate system 258 until an edge 26*a* of the glass pane 16 is detected. The home XY coordinates are recorded as point 1. The optical sensor 252 is then moved along the home coordinate system 254 X axis a second given distance D2. The optical sensor 252 is then moved along the Y axis until an edge 26*b* is detected by the optical sensor 252. The home XY coordinates of this position are recorded as point 2. The optical sensor 252 is moved along the X axis of the home coordinate system 258 a given distance D3. The optical sensors 252 is then moved along the Y axis until an edge 260*b* of the glass plate 16 is detected by the optical sensor 252. The XY coordinate of this location is recorded as point 3. Using the XY coordinates of the detected points 1, 2 and 3, the actual coordinate system 258 that corresponds to the corner 256 of the glass pane 16 is calculated.

In one embodiment, the optical sensor 252 is used to determine the overall dimensions of the glass. Two more points along edges of the glass pane 16 are required to determine the location, orientation and size of the glass pane 16. Points 1–3 are sensed as described above. The optical sensor 252 is moved along the X axis the given distance D2 and then moved along the X axis until a fourth edge 26*d* of the glass pane 16 is detected. The XY coordinates of the detected location are recorded as point 4. The optical sensor 252 is moved along the Y axis the given distance D2. The optical sensor is moved along the X axis until a third edge 26*c* of the glass pane 16 is detected by the optical sensor 252. The XY coordinates of this location are recorded as point 5. Points 1–3 are used to calculate the actual coordinate system corresponding to the corner 256 of the glass pane 16. The distance between points 1 and 5 and the orientation of the actual coordinate system are used to calculate the width of the glass. The orientation of the actual coordinate system and the distance between points 2 and 4 are used to calculate the height of the glass.

Figure 13:
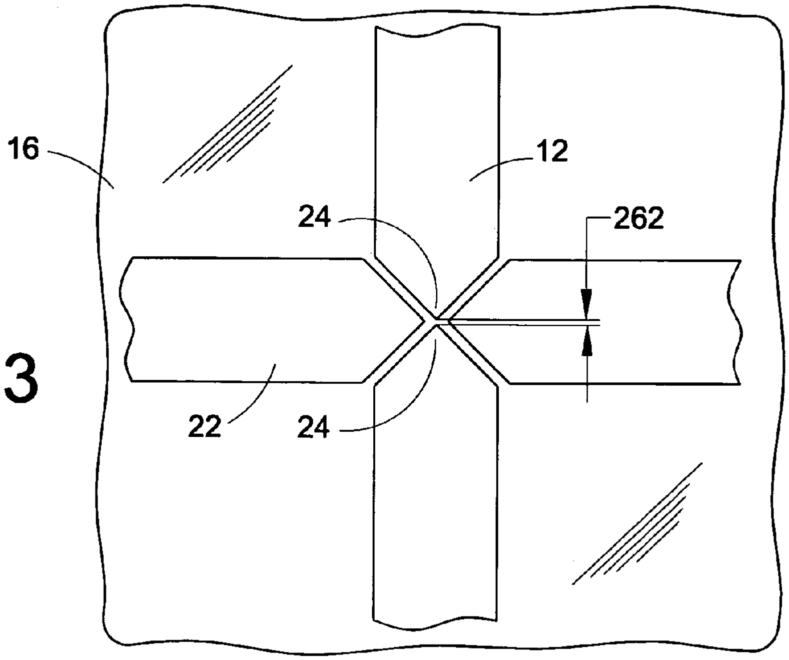
FIG. 13 is a schematic representation a decorative pattern of tape.
Figure 14:
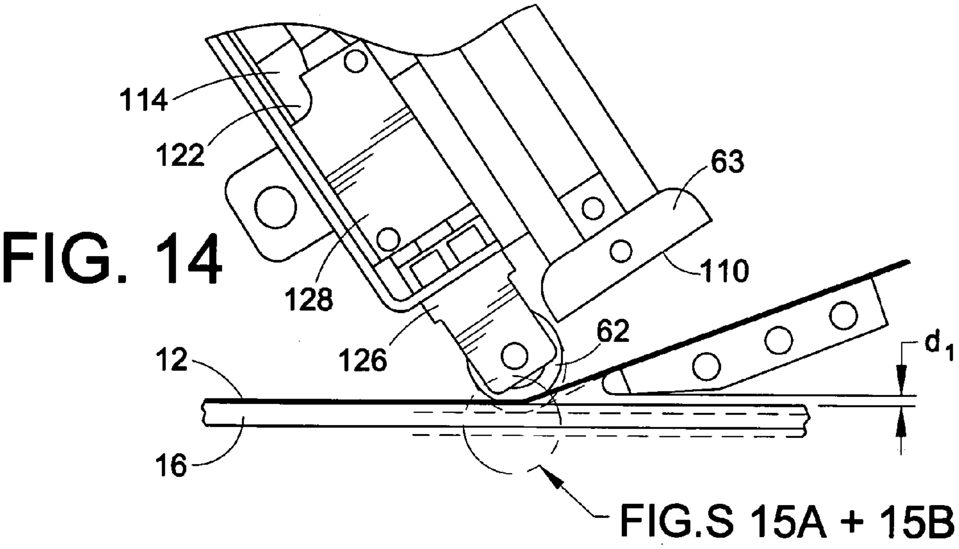
FIG. 14 is a front elevational view of tape pressed onto a glass pane by a pressure roller.

Referring to FIGS. 13, 14 and 15, the engagement actuator 122 that carries the pressure roller 62 includes a linear position sensor 128. The linear position sensor 128 senses the position of the pressure application wheel 62 relative to the tape dispenser 40. A signal is provided by the linear position sensor 128 to the controller 44. When the pressure application wheel 62 is in engagement with the tape 14 and the glass pane 16, the signal provided by the linear position sensor 128 provides an indication of the distance d1 between the glass pane and the tape dispenser 40. The signal provided by the linear position sensor 128 is processed by the controller. The controller causes the vertical motor 240 to move the tape dispenser 40 to a specified distance above the glass pane 16. One acceptable linear position sensor 128 is Northstar #PELMIX3-02.5-101.

Variations in thickness of the glass pane 16 or variations in the flatness of the table top change the distance d1 between the tape dispenser 40 and the glass pane 16. In the exemplary embodiment, the linear position sensor 128 continually provides a signal to the controller 44. The controller 44 controls the vertical motor 240 to maintain the tape dispenser 40 at a specified distance above the glass pane 16.

FIG. 13 illustrates four strips 22 of tape 12 applied to a glass pane 16. Inconsistencies in the point to point gap 262 between the pointed ends of the strips 22 create cosmetic effects. For example, if the point to point gap is too large, it will be readily apparent to an observer that the glass is not beveled. A reduction in the point to point gap could result in overlapped tape segments.

Figure 15A:
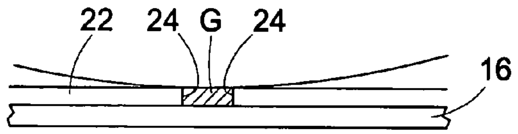
FIG. 15A is a schematic representation of tape ends applied by a tape dispenser at a given distance from a glass plate.
Figure 15B:
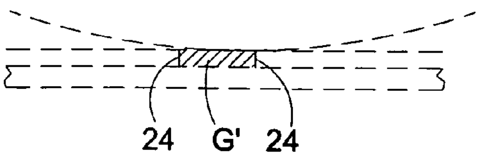
FIG. 15B is a schematic representation of a first tape end applied by a tape dispenser a first distance from a glass plate and a second tape end applied by a tape dispenser a second distance from a glass plate.
Figure 16:
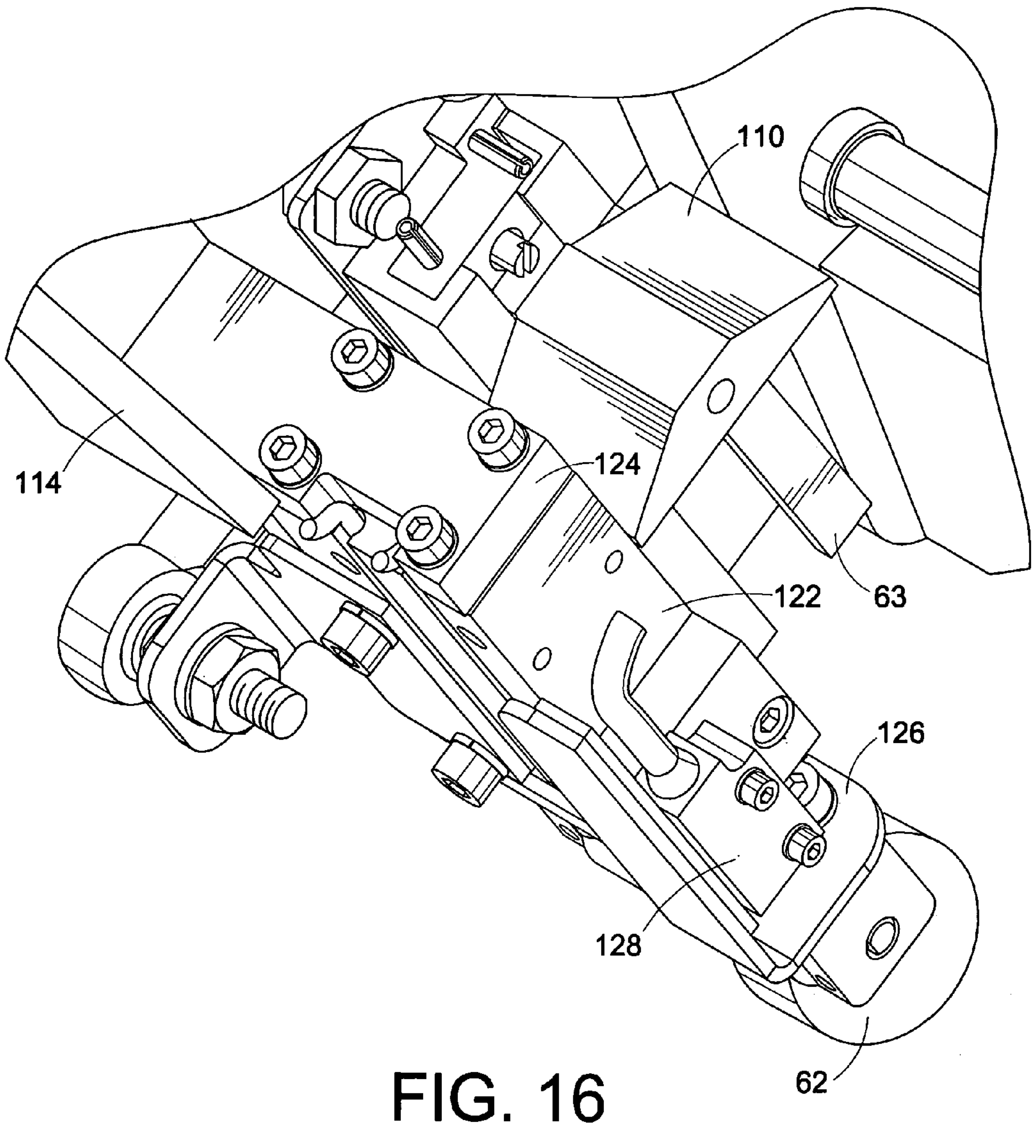
FIG. 16 is an enlarged perspective view of an actuator for removing portions of tape that are not applied to a glass pane from a tape liner and a pressure roller for applying tape to glass.

FIG. 14 illustrates the effect of variations in thickness of the glass 16 on the application of strips 22 of tape 12 to the glass 16. FIG. 14 shows that the pressure application wheel 62 presses a different portion of tape 12 onto the glass 16 depending on the distance between the tape dispenser 40 and the glass pane 16. FIG. 15A shows the point to point gap G between ends 24 of tape 12 applied where the distance between the tape dispenser 40 and the glass pane 16 is constant. FIG. 15B shows the point to point gap $G^1$ between ends 24 of a first strip and a second strip where the dispenser 40 and glass pane 16 was the first distance and a tape end 24*b* that was applied when the tape dispenser 40 was farther away from the glass pane 16 as indicated by the phantom lines in FIG. 14 when the end of the second strip was applied to the glass 16. As is shown in FIGS. 14 and 15, an increase in the distance between the tape dispenser 40 and the glass pane 16 between the application of two ends 24 of tape strips 22 increases the gap between the tape ends 24. Similarly, if the distance between the tape dispenser 40 and the glass pane 16 decreases between the time the end of a first strip 22 of tape 12 is applied to the glass 16 and an end of a second strip 22 of tape 12 is applied to the glass 16, the point to point gap between the strips 22 decreases. The linear position sensor 128 allows the controller to maintain the tape dispenser 40 at a specified distance above the glass pane 16 to minimize variations that result from variations in distances between the tape dispenser 40 and the glass pane 16. Maintaining a minimum distance between the dispense head and glass surface achieves consistent point to point gaps. In testing a distance of approximately 0.050" has proven consistent results. At this distance the chad points could contact the glass and be pressed by the pressure roller. In the exemplary embodiment, the controller calculates when the chad points are near the glass, and signals the z-axis actuator to lift.

Controller Operation

Figure 20:
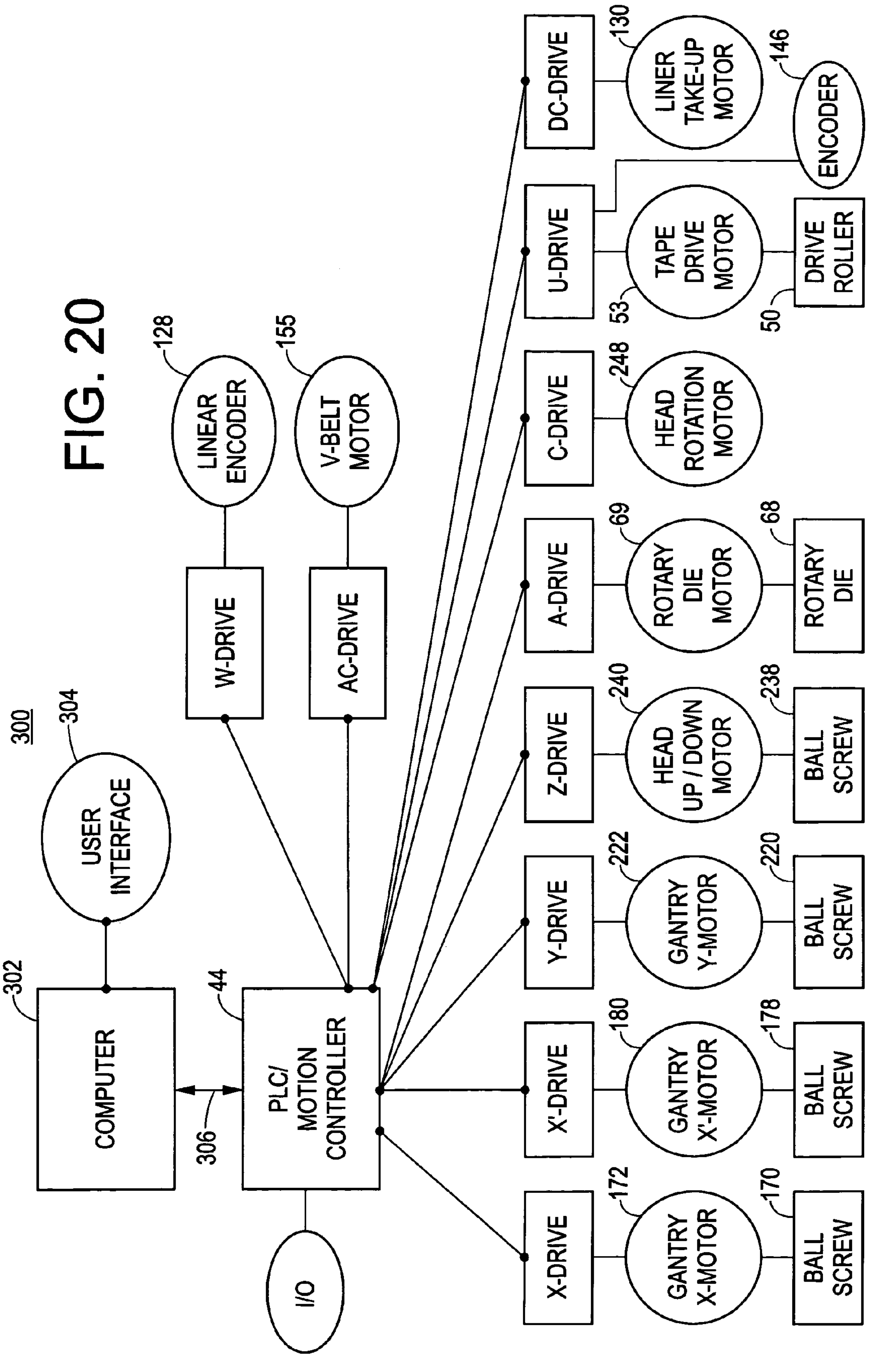
FIG. 20 illustrates an overview of a schematic of the control system for the tape dispensing unit.

FIG. 20 illustrates a schematic of a control system 300 for controlling a number of motors included in the tape dispensing system 10. A computer 302 is coupled to a network (not shown) and is most preferably a specially programmed personal computer running an operating system compatible with network communications. The computer 302 receives a schedule indicating the patterns of tape to be applied to multiple pieces of glass. These pieces may all be of a particular size or they may be the pieces for a particular job, order or customer. The schedule is generated by a separate computer that is coupled to the computer 302 depicted in FIG. 20 by means of a network interface. A user interface 304 for the computer in FIG. 20 constitutes a touch panel screen and keyboard which allows an operator of the tape dispensing system 10 to control operations of the system.

A two way serial communications link 306 exists between the computer of FIG. 20 and a motion controller 44 specially programmed for co-ordinated energization of a number of motors and receipt of a number of input signals derived from various sensors located within the tape dispensing system. One acceptable controller is a Delta Tau UMAC motion controller having a twenty-one slot chassis. The computer 302 transmits control signals to the motion controller 44 for each pane of glass that is to be taped by the tape dispensing system. Thus, the computer receives a schedule from a remotely located computer, evaluates that schedule, and sends a set of controls to the motion controller for each pane of glass until all panes in the schedule have been taped.

The motion controller 44 interfaces with a number of motor drives 310, 312, 314, 316, 318, 320, 322, 324, 326, 328 for different motors used in the system. These motors position the tape dispenser 40 above a horizontal surface which supports a glass pane or lite. The motors also control various actions performed by the tape as the tape dispenser 40 moves relative to the glass. Three direct current servo motors 172, 180, 222 coupled to the gantry 42 control the position of the tape dispenser 40 in an x-y plane above the glass. Two motors designated gantry motor 172 and gantry 42 motor 180 are energized by the controller in a coordinated fashion with each other to move the gantry 42 back and forth. A third motor designated gantry motor 222 moves the tape dispensing unit across the horizontal support 212 extending over the glass. These motors are servo motors activated with a direct current signal in either of two directions. Coordinated energization of these motors positions the tape dispenser 40 during tape dispensing as well as positions the tape dispenser prior to application of tape to the glass.

A separate feature of the invention is sensing glass orientation (described above). These motors 172, 180, 222 also drive the tape dispenser 40 relative to the glass so that an optical sensor 252 mounted to the dispenser can determine the glass orientation. The optical sensor communicates signals by means of an input to the motion controller. Additional inputs that are used by the motion controller are discussed below.

An additional motor 240 moves the tape dispensing unit up and down to change the gap or spacing between the tape dispenser and the glass. This motor 240 is also a direct current servo motor for allowing the tape dispenser to be moved up and down. During operation of the system 10, a piece of glass to be taped is delivered by means of a v-belt conveyor system to a position relative to a home position of the tape dispenser 40. The belt drive of the this conveyor is operated by an alternating current drive motor 155 whose operation is also controlled by the motion controller. In the exemplary embodiment, the alternating current drive operates in two directions and delivers the glass for taping, and then subsequent to taping drives the glass from the surface of the table in the same direction of motion used to deliver the glass to the table. In an alternate embodiment, the alternating current drive delivers the glass for taping and then subsequent to taping drives the glass from the surface of the table in the opposite direction of motion used to deliver the glass to the table. The glass orientation is monitored by the motion controller and in response to this indication, the controller knows the angular direction with respect to a system axis it needs to move the tape dispenser for appropriate application of tape to the glass.

The tape dispenser is also mounted for rotation about a vertical axis through a range of 210 degrees. Since the tape dispenser unit always dispenses tape in the same direction that is dictated by the orientation of the platen 52, by reorienting the dispenser, the tape can be applied along any direction and specifically, a direction controlled by the angular orientation of the glass as it is delivered to a position on the table 38. The angular orientation of the tape dispenser 40 is controlled by a head rotation motor 248 which also constitutes a direct current servo motor which can be driven in either direction.

A pressure wheel is brought into contact with the tape as it is being dispensed from the tape dispenser 40. The location of the wheel is controlled by a pneumatic actuator 92 that raises and lowers the pressure wheel into and out of contact with the tape. Initially, as the end of the tape is being fed from the unit, and separated from the liner or backing, the pressure wheel is removed from the glass surface to allow the tape to contact the glass and adhere to that glass prior to engagement of the pressure wheel. At various points during application of the tape, the tape is cut or scored to define the two ends of a piece of tape. Application of multiple such pieces of tape defines the appearance of the finished lite.

A rotary die contains multiple dies and is driven by a motor 69 that is controllably energized to position an appropriate die in relation to an anvil or backing for the die so that when the anvil is moved into position an appropriate pattern is scored into the tape. The rotary die motor 69 also constitutes a direct current servo motor which allows the die to be oriented and then rotated during movement of the tape once the anvil has been moved into position for scoring.

As tape is being delivered to the glass, a drive motor 53 is responsible for pulling the tape from the tape spool 48 and a rewind motor 130 is responsible for rewinding the backing material after the tape has separated from the backing material in the region of the platen and is applied to the glass. The tape drive motor 53 is a direct current servo motor which unwinds the tape from the spool 48 and delivers it to the region where it separates from its backing or liner. One acceptable tape drive motor is Yaskawa model number SGMAH-01. The liner take up motor 130 is a DC servo motor that is coupled to a take up reel by a clutch mechanism to allow the liner to be rewound onto a take up reel subsequent to application of the tape to the glass. When the tape is not being applied to the glass, the clutch mechanism allows the motor 130 to continuously rotate the wheel and apply a tension to the liner material.

Figure 21:
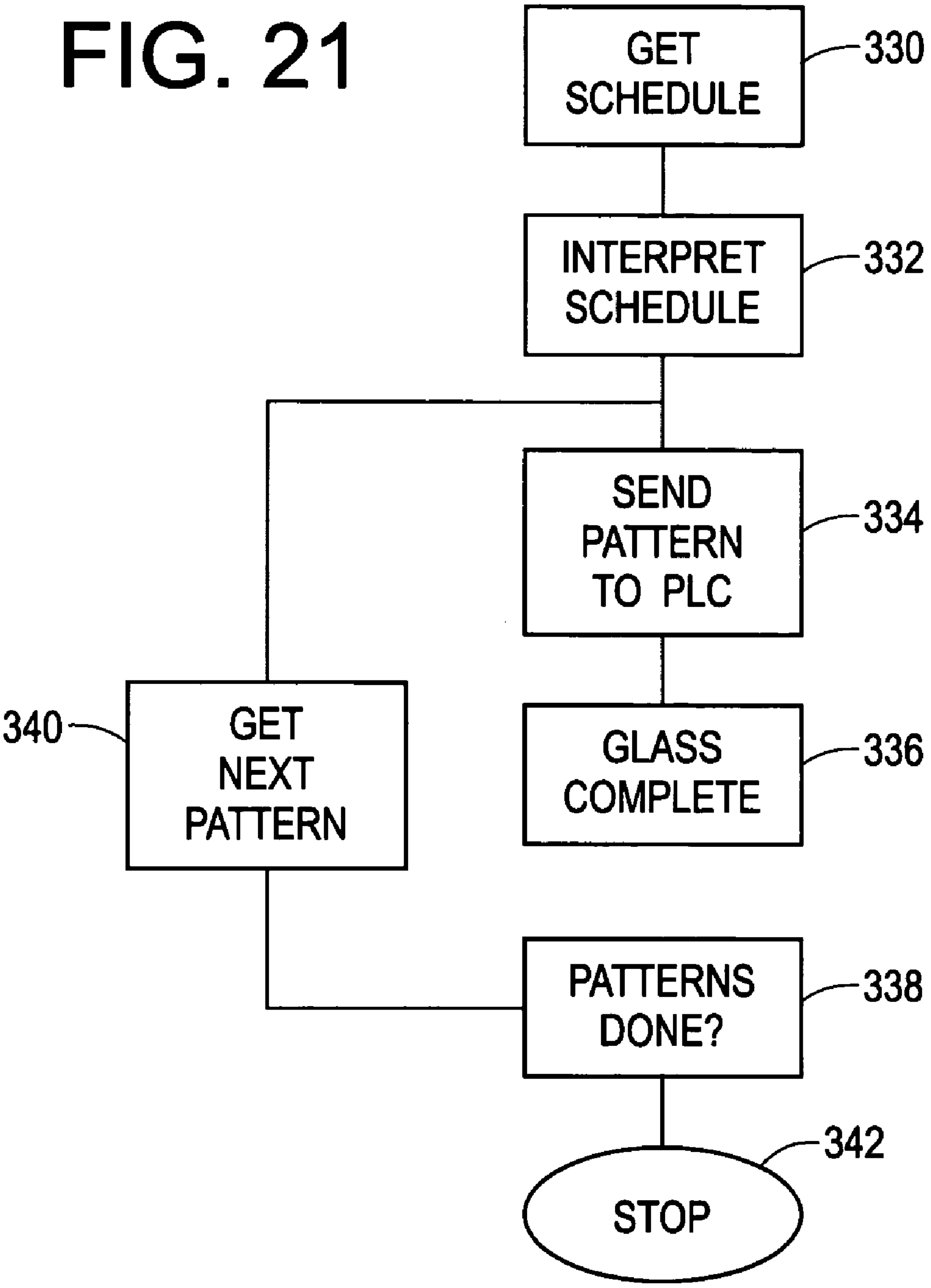
FIGS. 21 and 22 are flow charts depicting processing performed by a computer and motion controller during application of tape to a glass surface.
Figure 22:
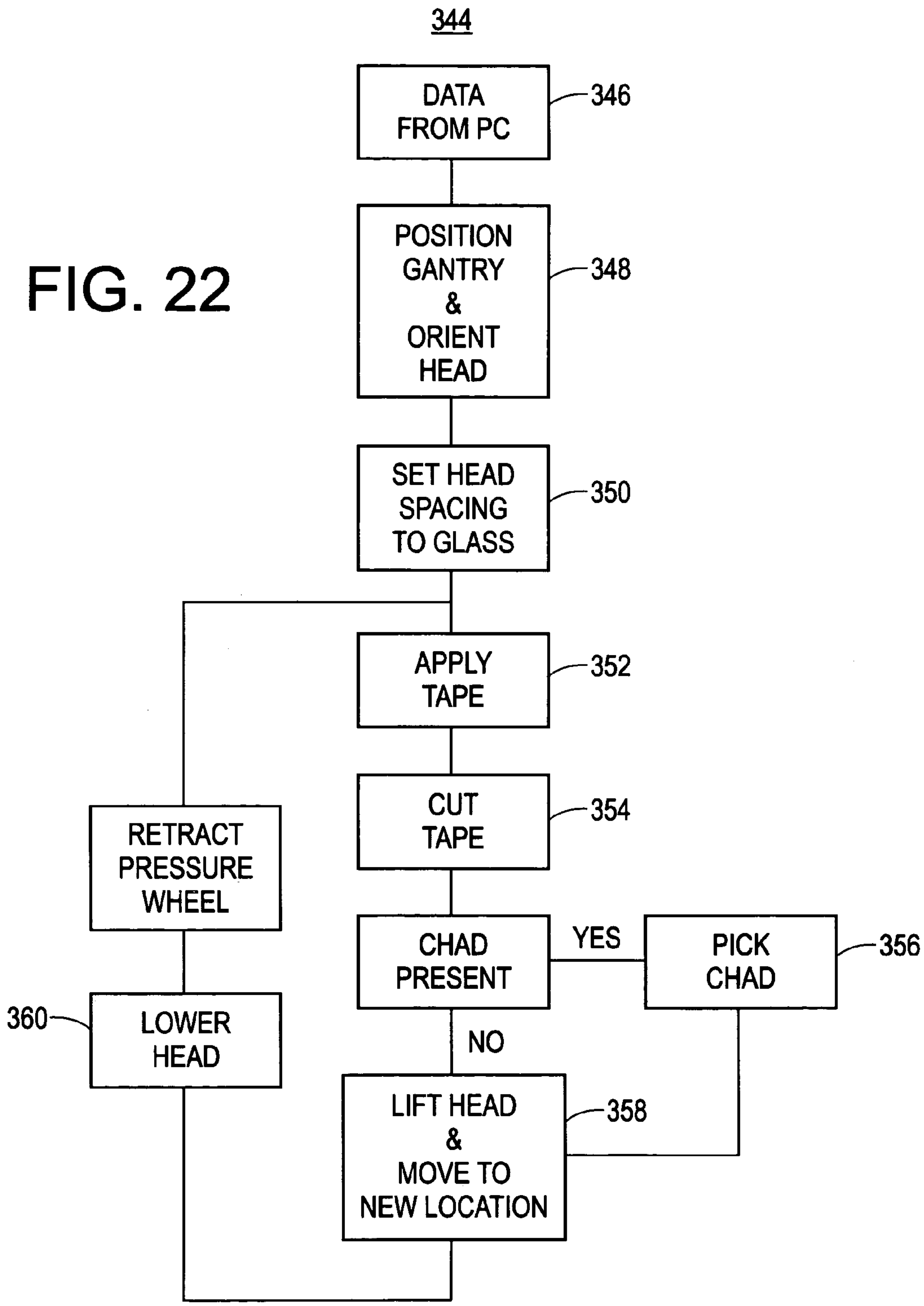

FIGS. 21 and 22 are flow charts depicting processing steps performed by the computer 302 and the motion controller 44 during application of tape to a glass surface. In an automatic mode of operation depicted in FIG. 21, the personal computer 302 shown in FIG. 20 gets a schedule 330 by means of a network connection and interprets 332 that schedule to determine the sequence of controls to be sent to the motion controller. A first pattern is sent 334 to the motion controller by means of the bi-directional communications link 306 shown in FIG. 20. This control constitutes an ASCII file containing control points for application of the tape to the glass as well as cut patterns to be used for the tape as it is being cut at its ends.

Once a particular pattern of tape pieces has been completed 336 as indicated by a signal from the controller 44, the computer awaits receipt of a signal that an operator has pressed a transfer enable button to move the pane from the table upon which it rests. The computer then determines 338 whether all patterns have been completed. If not, a next pattern is obtained 340 and a next subsequent control sequence sent to the motion controller 44. Once all patterns have been completed, the computer stops 342 the transmission and awaits further schedules from the network computer.

In a so-called semi-automatic mode of operation, the operation of control system is the same except that an operator must press a region on the user interface 304 labeled 'cycle start' at which point the next schedule or program of tape dispensing is sent to the motion controller. In a manual mode of operation, automatic operation is disabled. In this manual mode, maintenance personnel can verify all the individual operations that are performed by the motion controller 44 in a co-ordinated fashion in automatic mode. In manual mode the user interface presents control options that the user activates by means of the touch sensitive screen to cause the various motors to be energized. For example the tape dispenser 40 can be moved up or down or rotated by the user by tapping on the screen. This causes the various motors to be actuated in a jog mode which briefly energizes that motor.

Receipt of a control pattern from the personal computer causes the motion controller to execute a process 344 shown in FIG. 22. The data is received 346 from the personal computer and this causes the controller to position the gantry and orient the tape dispenser 348 in an appropriate position for the piece of a glass awaiting to be taped. The controller then sets the head spacing 350 between the glass and the tape dispenser as well as retracting the pressure wheel away from the glass surface. Movement of the tape dispenser in coordinated fashion while unwinding tape from the supply causes the tape to be applied 352 to the glass surface and once this process begins, the motion controller brings the pressure wheel against the tape after it has contacted the glass. Application continues until an end position for the tape is reached at which point the end of the tape is cut 354. Depending upon the cut pattern, a discarded chad may remain in contact with the liner or backing which supports the tape as it is unwound from the supply. If this chad is present, it must be removed 356 from the backing and if it is not present due to the configuration of the cut applied to the tape, the head is lifted away 358 from the glass and moved to a new location. If a chad is removed, an actuator moves a capture device 108 into contact with the tape just downstream from the die prior to lifting of the head away 358 from the glass. The controller moves the tape dispensing unit to a new location and lowers 360 the head in preparation of applying tape at a next location. As noted, prior to this step, a pressure wheel is retracted 362 until an end of the tape is applied to the glass at which point the pressure wheel is brought into contact with the tape on the glass. This process continues until all pieces of tape have been applied to the glass for the particular pattern at which point the controller sends a signal to the personal computer indicating a schedule for a next subsequent piece of glass is needed. The controller therefore sits in an endless loop awaiting for instructions from the personal computer so long as power is applied to the system.

Listing 1 is a sequence of steps in pseudo-code for motion program control to for a cross pattern wherein tape pieces extend across a pane to the pane's center region to form a cross.

Listing 1

Open and clear program buffer
Set Absolute position mode
preload U-axis position to 0
Pre-position A-axis for next required cut
Check if last die used on previous pattern is different that the
  first die required on current pattern. If it is different then
  make initial tap cut for first component.
  Prepare the A-axis (die) for cutting at the desired location
  Turn on the liner take-up motor
  Feed Tape and Cut
  Turn off liner-take up motor
  Pick Chad and move X, Y and C to the starting position
for the component
Apply Component
  Touch off glass to check for variation in table top height,
adjust Z-axis if necessary
  Turn on the liner take-up motor Feed tape to glass Lower Roller Pre-position A-axis (die) for required end of component cut Prepare the A-axis (die) for cutting at the desired location Move X Y position to end point of the component and cut tape on the fly when the tape is at the desired location Turn off the take-up motor Pick chad and move X, Y, C to the starting position of the next component Repeat for all components in the pattern.

End of Listing 1

A number of sensors located throughout the system send signals back to the motion controller. Additionally, output signals are transmitted from the controller to solenoids for activating certain motions such as movement of an anvil 70 for backing the cutting die 68. Table 1 below indicates various input/output connections 306 utilized by the motion controller 44 and/or personal computer 302 during operation of the tape dispenser.

TABLE 1

| | |
|---|---|
| Proximity switches | X-axis home and maximum and minimum overtravel |
| Proximity switches | X' axis home and maximum and minimum overtravel |
| Proximity switches | Y axis home and maximum and minimum overtravel |
| Proximity switches | Z-axis home and maximum and minimum overtravel |
| Proximity switches | C-axis home and maximum and minimum overtravel |
| Proximity switch | A-axis home |
| Amplifier drive | seven servo motors |
| E-stop button | Removes all power from controller |
| Master Start | resets controllers |
| Transfer ready button | Signals machine that the operator is ready to receive the glass at the exit side when the pattern is complete. Must be pressed for every pane. |
| Pause button | Pauses motion when pressed. All outputs remain in current state. |
| Cycle Start | Starts motion program resident in motion controller |
| Cycle stop | Cancels current pattern. Motion will decelerate to a stop. Dispenser returns to starting position of pattern |
| Mode switch | Manual/Semi-Auto or Auto Selector PC interface |
| Manual Glass Transfer | Operator moves glass PC interface |
| Pressure Switches | Machine Air OK, Vacuum ON |
| Linear Encoder | Tape off glass, relative positioning of head to glass feedback distance. |
| Reed Switches, verify positions | Anvil up/down, pressure roller forward, back, up, down, v-belt up/down |
| Photo-eyes | Glass on table, tape spool empty |
| Lamps | Pause, Cycle Start, Master Start |
| Solenoids | Anvil, Roller forward, Roller Down, Vacuum on, V-belt up/down, |
| Motor outputs | V-belt motor, blower motor |

System Operation

In operation, a pattern, such as those depicted in FIGS. 1A and 1B, and a size of a glass pane 16 is selected and inputted into the computer. The personal computer sends a series of signals to the motion controller by means of a bidirectional communication connection for processing the glass pane 16. Referring to FIG. 3, a glass pane 16 is placed on the table top 148. The conveyors 154 move the glass pane 16 to a location that is near the home coordinate system. Typically, the glass pane 16 will not be aligned with the home coordinate system. In the exemplary embodiment, the controller 44 provides signals to the servo motor 172, 180 and 222 to move the tape dispenser 40 and optical sensor 252 over the glass pane 16.

Referring to FIG. 17, the tape dispenser 40 and optical sensor 52 are moved by the gantry 42 to detect a first point along edge 26$a$ of the glass pane 16, and second and third points along edge 26$d$ of the glass pane 16. The detected points P1, P2, P3 are processed by the computer to determine the actual coordinate system 258 that corresponds to the corner 256 of the glass pane 16.

The controller 44 causes the gantry 42 to position the tape dispenser 40 with respect to the actual coordinate system 258 of the glass pane 16. Referring to FIGS. 4 and 5, the controller 44 provides a signal to the vertical servo motor 240 that causes the vertical servo motor 240 to move the dispenser 40 down from a most elevated position. The dispenser 40 is spaced apart from the glass pane 16 by a relatively large distance at this point. The controller 44 provides a signal to the engagement actuator 122 that causes the engagement actuator 122 to bring the pressure application wheel 62 into engagement with the glass pane 16. The linear position sensor 128 provides a signal to the controller 44 that indicates the distance between the tape dispenser 40 and the glass pane 16. In response, the controller 44 provides a signal to the vertical servo motor 240 that moves the tape dispenser 40 to a desired distance above the glass pane 16 for dispensing tape 12 onto the glass pane 16.

Referring to FIG. 6, the controller 44 provides a signal to the drive roller 50 that causes the dispenser 40 to begin dispensing tape 12. The pressure application wheel 62 is lifted from the glass pane 16 momentarily as an end 24 of a strip of tape 22 is paid out by the dispenser 40. The pressure application wheel 62 is moved into contact with the tape 12 to press the end 24 of the strip 22 of tape 12 onto the glass pane 16. The controller 44 causes the gantry 42 to move with respect to the coordinate system 258 of the glass pane 16 and the drive roller 50 to dispense tape 12 to create a decorative pattern 18 on the glass pane 16. During application of tape strips 22 onto the glass pane 16, the linear position sensor 128 continually provides a signal back to the controller 44 that indicates the position of the tape dispenser 40 with respect to the glass pane 16. In response, the controller 44 controls the vertical servo motor 240 to maintain the selected distance between the glass pane 16 and the tape dispenser 40.

When a second end of a strip 22 being applied to the glass pane 16 is about to be applied, the controller 44 provides a signal to the rotary die 68 that causes the rotary die 68 to rotate to a selected pattern that will be scored into the tape 12 corresponding to an end 24 of a tape strip 22. The dispenser 40 continues to apply tape 12 to the glass pane 16. When the tape 12 that corresponds to a second end of the tape strip 22 reaches the rotary die 68, the rotary die engagement actuator moves the rotary die engagement anvil 70 into contact with the liner 14. The rotary die engagement anvil 70 presses the tape 12 into engagement with the rotary die 68. The drive roller 50 continues to dispense tape 12, the rotary die 68 rotates the same speed as the dispensed tape 12 and the gantry 42 continues to move the dispenser 40 over the glass pane 16.

After a pattern 96 corresponding to the end 24 of the strip 22 is scored into the tape 12, the tape 12 is advanced until a chad 112 of tape that is not be applied to the glass pane 16 is located beneath the chad actuator 108. The controller 44 stops the gantry 42 from moving the dispenser 40 and stops the drive roller 50 from advancing the tape 12 and liner 14. The chad actuator 108 is extended to bring an adhesive surface on the chad actuator 108 or a previous adhesive surface on a previously removed chad into contact with the chad on the tape 112. The chad actuator 108 is retracted to pull the chad of tape 112 from the liner 14.

If the chad of tape 112 is large enough that an end of the chad would be pressed onto the glass 16 by the pressure application wheel 62 before the chad is removed from the liner 14, the controller 44 provides a signal to the actuator 118 that rotates the arm 124 to move the pressure application wheel 62 away from the end of the chad. In the illustrated embodiment, to prevent the chad points from touching the glass, the z-axis could lift as the chad reaches the platen. The actuator 118 moves the pressure application wheel to its original position after the chad is removed.

After the chad 112 is removed from the liner 14, the controller 44 causes the drive roller 50 to dispense tape 12 and the gantry 42 to move the tape dispenser 40 over the glass pane 16. The drive roller 50 dispenses tape 12 and the gantry 42 moves the dispenser 40 over the glass pane 16 until the second end 24 of the strip 22 of tape 12 is applied to the glass pane 16 by the pressure application wheel 62. After the strip of tape 12 is applied to the glass pane 16, the controller 44 sends a signal to the vertical servo motor 240 that raises the tape dispenser 40 with respect to the glass pane 16.

The controller 44 causes the gantry 42 to move the dispenser 40 to a location above the glass pane 16 where the next strip 22 of tape 12 will be applied to the glass pane 16. The process is repeated until all strips 22 that make up the pattern applied to the glass pane are applied.

Applying Short Tape Segments

Figure 25:
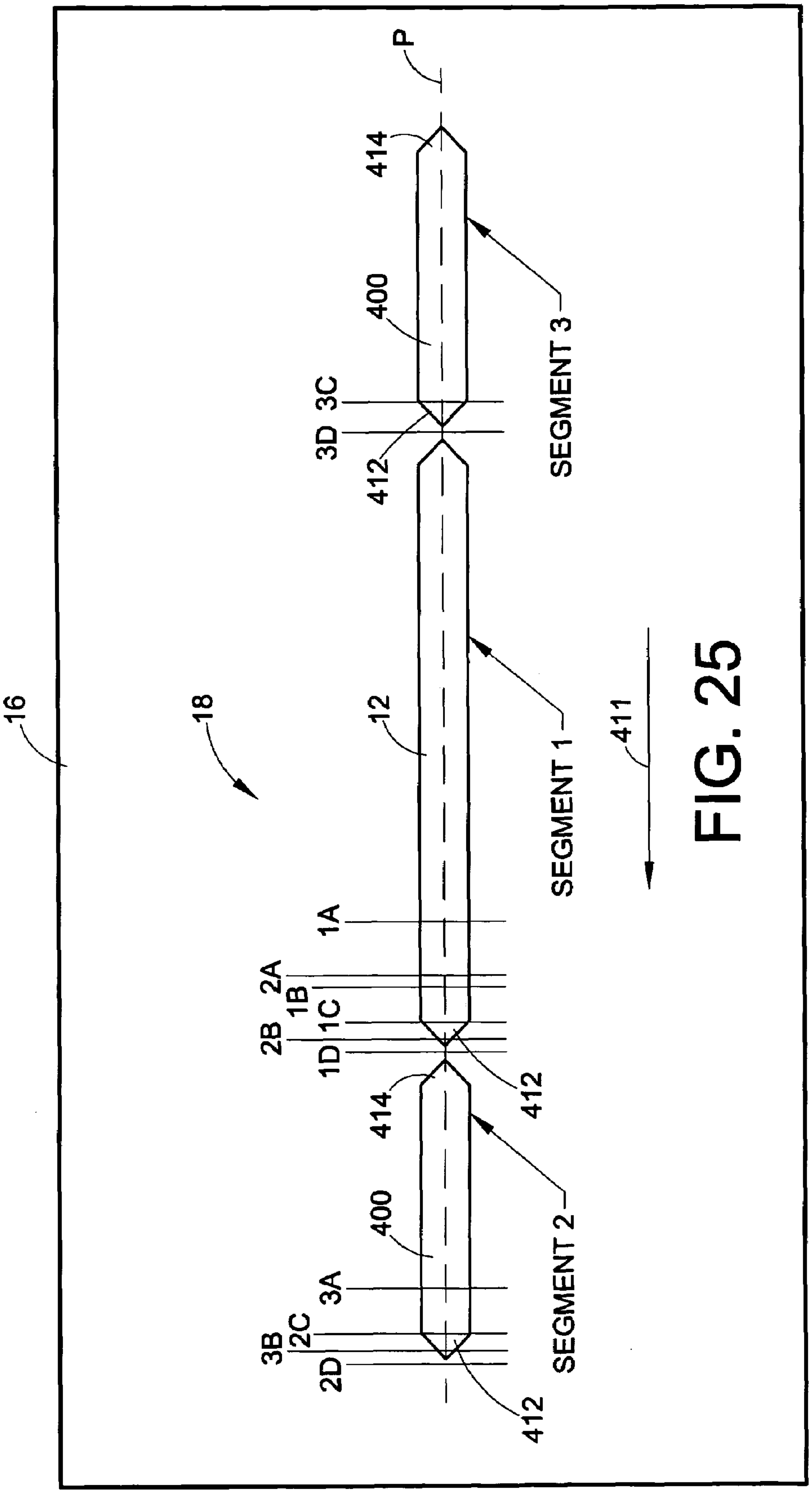
FIG. 25 is an illustration of a tape pattern applied to a glass pane.
Figure 26:
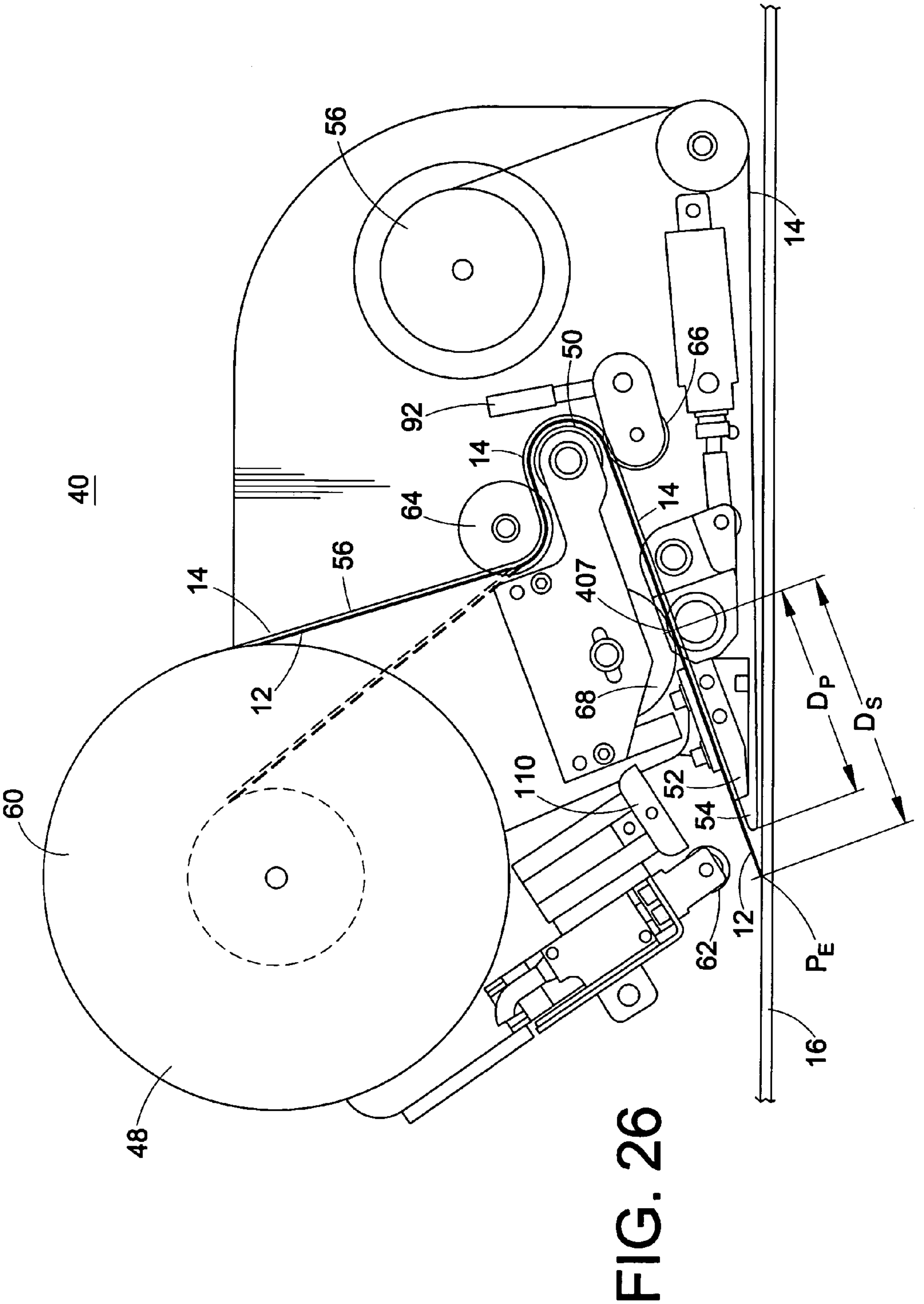
FIG. 26 is a schematic representation of a tape dispenser in accordance with the present invention.

In one embodiment, the system 10 is configured to apply decorative patterns 18 that include one or more short segments 400 (FIG. 25) a glass pane 16. Referring to FIGS. 26 and 26, these short segments 400 can be shorter than a distance $D_S$ between a cutter or rotary die 68 and a glass engagement position $P_E$ where the tape 12 applied by the dispenser or head 40 contacts the glass panel 6. These short segments 400 can also be shorter than a distance $D_P$ between the cutter or rotary die 68 and the angular front end portion 54 of the platen 52.

Figure 28:
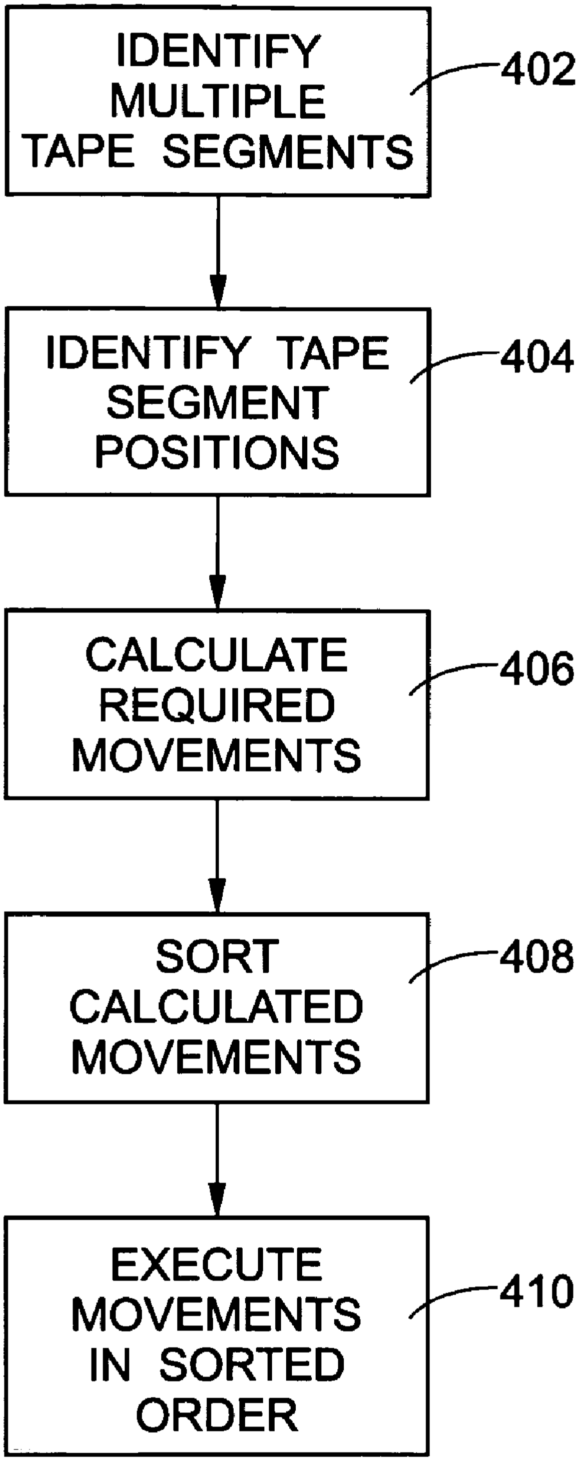
FIG. 28 is a flow chart depicting processing performed by a computer and motion controller during application of tape to a glass surface.

FIG. 28 is a flow chart that illustrates the steps performed by the controller 44 to apply short segments 400 to a glass pane 16 in a decorative pattern 18. The controller 44 identifies 402 multiple tape segments that are to be applied to the glass pane and identifies 404 the position of each tape segment on the glass pane 16. The controller calculates 406 all of the movements by the application head 40, the drive roller 50, and the cutter or die 68 required to apply the multiple tape segments to the glass pane 16. The controller sorts 408 the calculated movements based on the calculated movement of the drive roller 50 for each movement. The controller 44 execute 410 the movements in the sorted order to apply the multiple tape segments, which include short segments, to the glass pane 16.

Four movements are required to apply each tape segment in the exemplary embodiment. These movements are performed by actuation the four (five when the two carriages are driven independently on the two rails) independent servo motors that move the dispenser with respect to the glass pane (See FIGS. 3–5 and 7) and by the two servo motors that control the rotational movement of the tape drive roller and the rotary die cutter. The dispenser moves with respect to the glass pane in an X axis by actuation of the servo motor 172 and/or 180. The dispenser moves with respect to the glass pane in a Y axis by actuation of servo motor 222. The dispenser moves up and down with respect to the glass pane in a Z axis by actuation of servo motor 240. The dispenser rotates about the Z axis by actuation of servo motor 248. The tape is paid out of the dispenser by actuation of the drive roller servo motor. The rotary die cutter is rotated by the servo motor 69.

Figure 27:
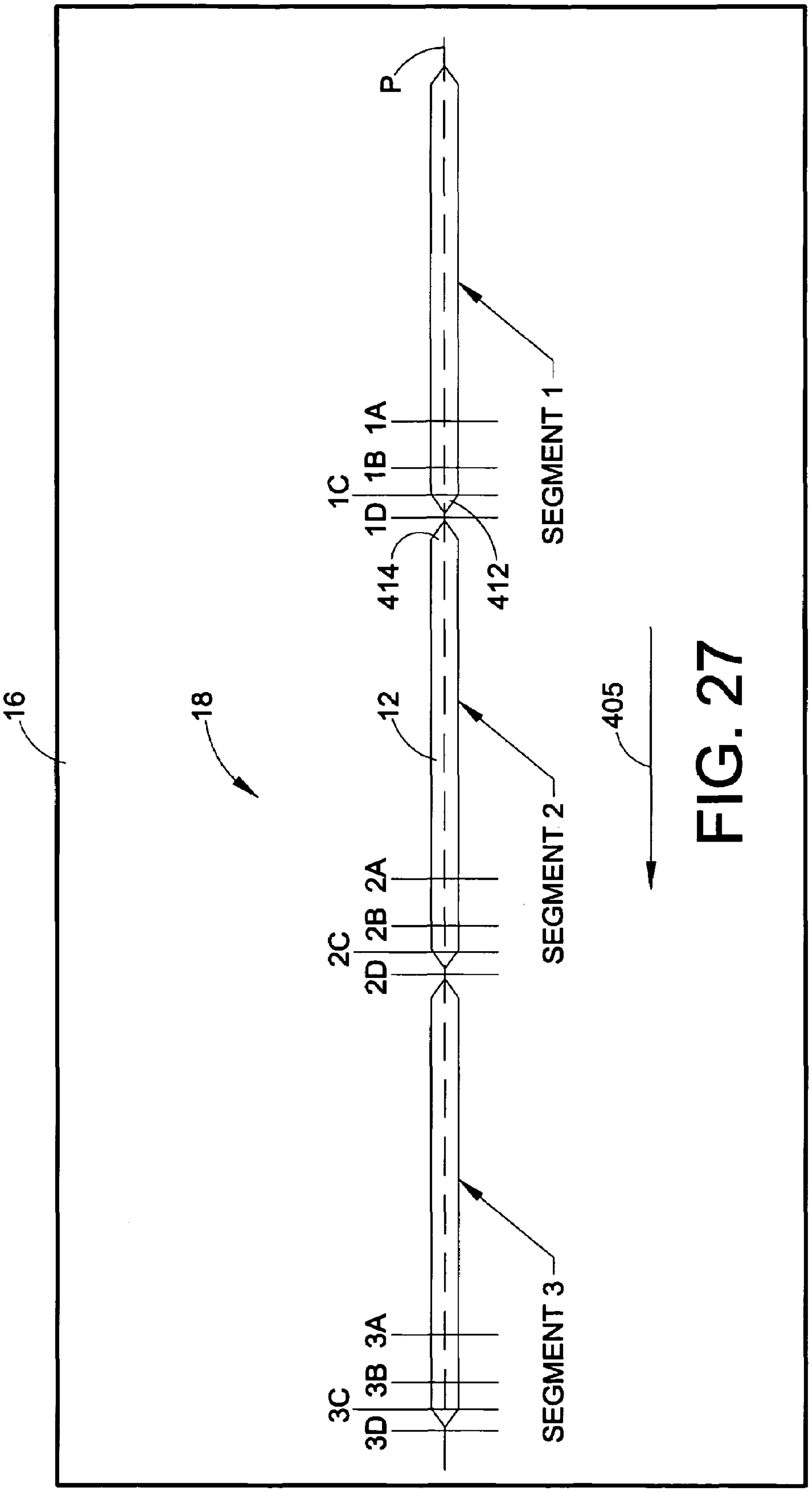
FIG. 27 is an illustration of a tape pattern applied to a glass pane.

In the first movement, tape 12 is advanced by the drive roller 50 as the application head 40 moves in an X-Y plane above the glass pane that is generally parallel to the glass pane. In the second movement, tape 12 is advanced by the drive roller 50 as the application head 40 moves with respect to the glass pane 16 and the rotary die 68 rotates to cut a trailing end 412 of the tape segment (FIGS. 25 and 27). In the exemplary embodiment, the leading end 414 of the next tape segment is also cut during the second movement. In the third movement tape is advanced from the application head by the drive roller as the application head moves with respect to the glass pane. In the fourth movement the pressure roller 62 presses a tape segment end portion against the glass pane 16.

FIG. 27 illustrates how three long segments (length greater than the distance between the cutter and the end of the platen) are applied to a glass pane. FIG. 27 shows three such "standard or long" length segments. The pattern is applied from right to left in this diagram as indicated by arrow 405. In the first movement 1A required for segment 1, movement of the dispenser along the X and Y axes and rotation of the tape drive roller are simultaneously started. Referring to FIGS. 26 and 27, the application head 40 starts moving along the programmed tape segment path P. At the same instant the tape-drive roller 50 starts paying out tape 12. The movement along the X and Y axes is coordinated with the rotation of the tape drive roller such that the combined speed, acceleration, and distance traveled by the dispenser 40 in the X and Y directions are the same as the combined speed, acceleration, and length of tape 12 paid out by the tape drive roller 50, so that the tape is not stretched or compressed as it is applied to the glass. The distance traveled in this first movement is dependent on the length of the tape segment. The longer the tape segment, the longer this movement will be.

Movement 1A ends and movement 1B starts at the point where the rotary die cutter 68 is aligned with the end of tape segment 1. In the second movement 1B required for segment 1 the dispenser 40 is moved along the path P, the tape drive roller 50 continues to pay out tape, and the rotary die 68 rotates to cut the trailing end 412 of segment 1 and the leading end 414 of segment 2. The length of this movement is dependent on the type of die cut being made. The die cut length for each type of cut is a variable and can be modified depending on the overall width of the tape and the type of cut being made. The wider the tape, the more tape the rotary die would have to roll-through to complete a die-cut, resulting in a longer movement.

Movement 1B ends and movement 1C begins when rotation of the cutter to create the ends of the tape segments is complete. The third movement 1C involves coordinated movement of the dispenser 40 along the path P and rotation of the tape drive roller 50. Movement 1C finishes segment 1 by paying out the remainder of the tape required for the segment. That is, the length of tape from the cutter to the end of the platen is advanced by the drive roller and applied to the glass pane by movement of the dispenser in the X and/or Y directions.

The last move, movement 1D involves movement of the dispenser 40 along the X and Y axes and rotation of the tape drive roller 50. The tape application head 40 is moved an additional distance, approximately 2-inches in the exemplary embodiment, along the tape segment path P to press the last portion of the tape segment onto the glass pane with the pressure roller. During this move, the tape drive advances the tape along the platen just enough to center the tape cut-out piece on the tip 54 of the platen to be removed by the cut-out picker mechanism. Movements 2A, 2B, 2C, 2D and movements 3A, 3B, 3C, 3D are similarly executed to apply tape segments 2 and 3 to the glass pane along the path P.

In the first three movements 1A, 1B, 1C, the amount that the tape application head moves in the X-Y direction, the amount of tape dispensed and the rotation of the die cutter are carefully calculated such that movement in the X-Y plane, rotation of the drive roller and rotation of the cutter are coordinated.

In the illustrated embodiment, the tape application head has a contact point 407 of the rotary die 68 against the anvil 70 (the point at which tape is being cut) that is a distance $D_P$ from the end of the platen. In the illustrated embodiment, this distance $D_P$ is approximately four inches. In one embodiment, whenever the application head is moved into position to dispense the next segment, there is already a length of tape equal to distance $D_P$ advanced past the rotary die. As such, if the die were to start cutting at this point, the shortest segment that could be cut would be longer than distance $D_P$. In that embodiment, this shortest segment that could be cut would be in the five inch range. The length of the shortest segment that could be cut depends on the die cut parameters and rotational offset before the cutting die begins to cut the tape. This rotational offset is referred to as the die to platen tooling offset.

In one embodiment, shorter segments 400 are produced by factoring information about more than one tape segment into the computations used to control the movements of the application head 40 and the rotations of the drive roller 50 and the cutter die 68. For example, the required movements for two to five segments may be computed at one time to allow short segments 400 to be cut and applied to the glass pane. Whenever a segment with a length less than the distance $D_P$ plus a small distance required to cut the short segment (a total of approximately five-inches in the illustrated embodiment) is produced, one or more of that segment's movements will be made before the previous segment is completely applied to the glass. For example, the die cut for a short segment will actually be made before the previous segment is completely applied onto the glass pane. In some cases, where there are several short segments in a pattern, the die cuts for two consecutive short segments could be made before the first segment in the pattern is completed.

Referring to FIG. 28, this type of "look-ahead" is accomplished by taking 402,404 a number of segments at a time and calculating 404 all the moves for the group of segments before the first segment is produced. Each X and Y-axis movement, drive roller movement, and cutter movement is calculated for each segment. Each of these movements is then sorted 408. The sort order is based on the drive roller position for the movement. Each movement is arranged such that there will be no negative, or backwards, movement of the drive roller.

FIG. 25 shows an example of how this sorting would work. FIG. 25 shows a 3-segment pattern 18 with one standard or long segment (segment 1) and two short segments (segment 2, segment 3). In the illustrated embodiment, at least one long segment is included in the group of segments to allow the short segments to be applied.

In the exemplary embodiment, the long segment (segment 1) is applied to the glass pane first. Starting with the longest segment eliminates tape scrap. In another embodiment, a pattern comprised entirely of short segments 400 can be applied by first applying a scrap piece of tape to an area off the glass pane.

In the example of FIG. 25, the long segment (segment 1) is applied to the glass first. In the example of FIG. 25, the tape pattern is applied along path P from left to right as indicated by arrow 411. Movement of the dispenser 40 along the path P and rotation of the tape drive roller 50 are simultaneously started for the first movement 1A required for segment 1. Next, the XY movement of the dispenser along the path P and rotation of the tape drive roller are simultaneously performed for the first movement 2A required for segment 2 (short segment). Then, the dispenser 40 is moved along the path P, the tape drive roller 50 continues to pay out tape 12, and the rotary die rotates to cut the trailing end 412 of segment 1 and the leading end 414 of segment 2 to complete movement 1B of segment 1. Then, coordinated XY movement of the dispenser 40 along the path P axes and rotation of the tape drive roller 50 pays out the remainder of the tape 12 required for segment 1 in movement 1C. Then, the dispenser 40 is moved along the path P, the tape drive roller 50 continues to pay out tape, and the rotary die rotates to cut the trailing end 412 of segment 2 and the leading end 414 of segment 3 to complete movement 2B of segment 2. Then, the tape application head is moved to press the last portion of tape segment 1 onto the glass pane with the pressure roller 62 in movement 1D. Next, the dispenser 40 is moved along the X and Y axes (applying segment 2 along path P) as the tape drive roller 50 is rotated to pay out the tape 12 required for the first portion of segment 3 (second short segment) in the first segment 3 movement 3A. Then, coordinated movement of the dispenser along the path P and rotation of the tape drive roller 50 pays out the remainder of the tape 12 required for segment 2 in movement 2C. Then, the dispenser is moved along the path P, the tape drive roller continues to pay out tape, and the rotary die rotates to cut the trailing end 412 of segment 3 in movement 3B of segment 3. Then, the tape application head 40 is moved to press the last portion of the tape segment 2 onto the glass pane with the pressure roller 62 in movement 2D. Then, the head is moved into position to apply segment 3 and coordinated XY movement of the dispenser along the path P and rotation of the tape drive roller 40 pays out the tape 12 required for segment 3 in movement 2C. Finally, the tape application head is moved to press the last portion of the tape segment 3 onto the glass pane with the pressure roller 62 in movement 3D. Note that movements 2A and 2B of segment 2 are performed before application of segment 1 onto the glass pane is complete and movements 3A and 3B of segment 3 are performed before application of segment 2 onto the glass pane is complete.

Figure 29:
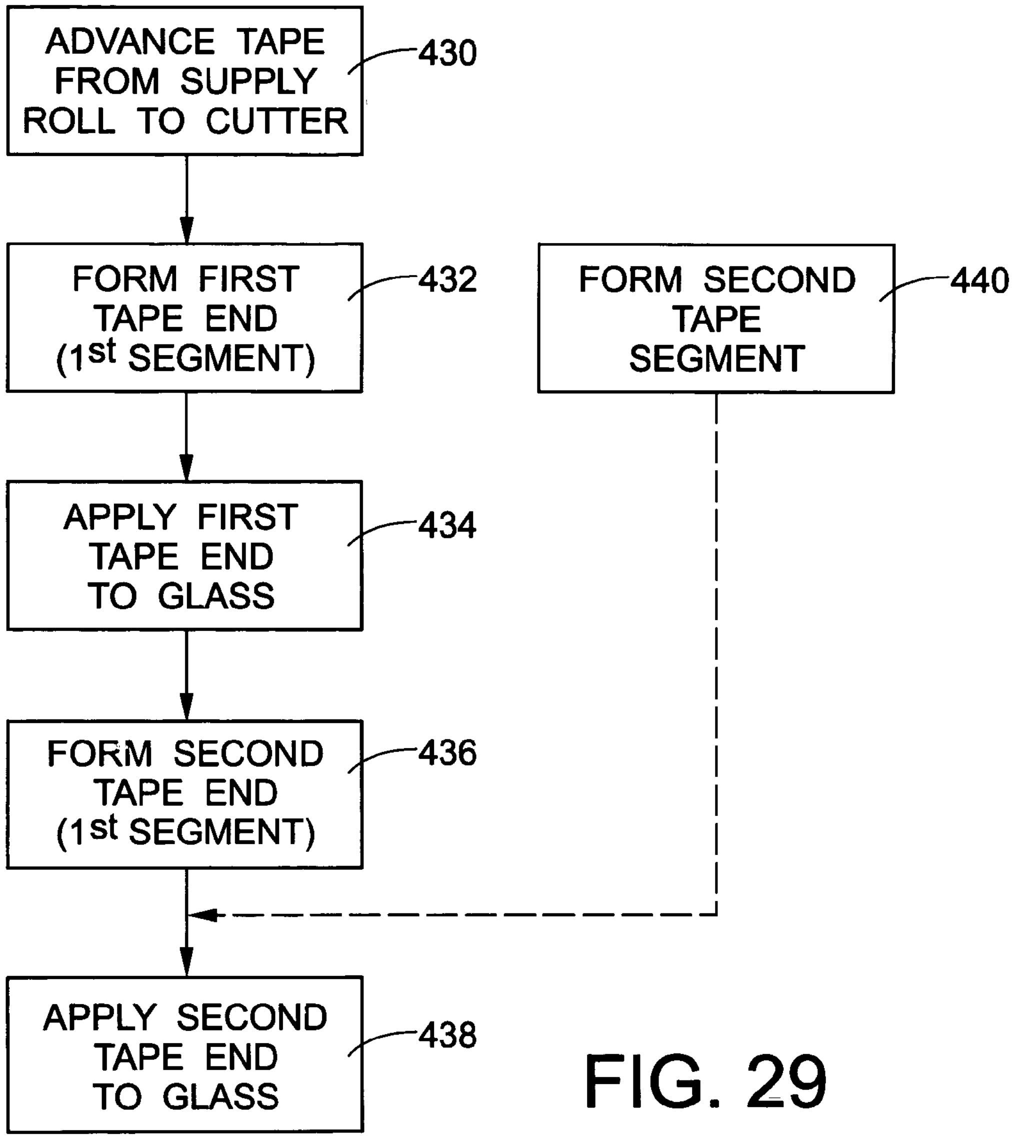
FIG. 29 is a flow chart illustrating a method of applying short tape segments to a glass pane.

Referring to FIG. 29, this system can be used in a method of applying short tape segments 400 to a glass pane 16. In the method tape is advanced 430 from the supply roll 60 to the rotary die cutter 68. The tape is cut with the rotary die cutting implement to form 432 a first end 414 of a first tape segment. The first end 414 of the first tape segment is advanced to a glass engagement position PE where it is applied 434 to the glass pane 16. The tape is cut with the cutting implement 68 to form 436 a second end 412 of the first tape segment. The second end of the first tape segment is advanced to the glass engagement position where it is applied 438 to the glass pane. The tape is also cut with the cutting implement to form 440 a second tape segment having first and second ends before the second end of the first tape segment is advanced to the glass engagement position. This allows tape segments that are shorter than the distance between the rotary cutter and a glass engagement position to be applied to the glass pane.

Many modifications and variations of the invention will be apparent to those skilled in the art in light of the foregoing disclosure. Therefore, it is to be understood that, within the scope of the appended claims, the invention can be practiced otherwise than has been specifically shown and described.

We claim:

1. A method of applying multiple tape segments onto a succession of one or more glass panes from a tape application head that supports a tape cutter, comprising:

a) moving a glass pane to the tape dispensing station and identifying multiple tape segments to be applied to the glass pane and the position of each tape segment on the glass pane;

b) calculating movements i) of the tape application head with respect to the glass pane, ii) of a drive roller that advances tape dispensed by the application head, and said tape cutter that defines end portions of each tape segment required to apply the multiple tape segments to the glass pane;

c) sorting the calculated movements based on the calculated movement of the drive roller for each movement to dispense at least one tape segment longer than a certain length before applying any tape segments shorter than said certain length to the glass pane and thereby avoid rewinding tape to position the tape with regard to the tape cutter; and d) executing the movements in the sorted order to dispense multiple tape segments from the tape dispenser onto the glass pane.

2. The method of claim 1 wherein the movements of each tape segment comprise a first movement where tape is advanced by the drive roller as the application head moves with respect to the glass pane, a second movement where tape is advanced by the drive roller as the application head moves with respect to the glass pane and the cutter cuts an end of the tape segment, and a third movement where tape is advanced from the application head by the drive roller as the application head moves with respect to the glass pane.

3. The method of claim 2 wherein the movements of each tape segment additionally comprise a fourth movement where a pressure roller presses a tape segment end portion against the glass plate.

4. The method of claim 2 wherein movement of the drive roller and movement of the application head are coordinated such that a distance traveled by the application head is equal to a length of tape advanced by the drive roller in the first second and third movements.

5. The method of claim 1 wherein a severing of the tape from the supply is performed by a rotary die mounted to the tape application head.

6. The method of claim 1 wherein movement of the drive roller and movement of the application head are coordinated such that a distance traveled by the application head is equal to a length of tape advanced by the drive roller.

7. The method of claim 1 wherein a first segment to be applied is selected to have a certain length that is greater than a distance between the cutter and a glass engagement position.

8. The method of claim 1 wherein the certain length of the selected first segment to be applied has a length greater than four inches.

9. The method of claim 1 further comprising dispensing a piece of scrap tape having a length greater than a distance between the cutter and a glass engagement position to allow a tape pattern that includes only segments having lengths less than the distance between the cutter and the glass engagement position to be applied to the glass plate.

10. The method of claim 1 wherein the initial tape is dispensed onto a surface other than said subsequent glass pane.

11. A method of applying multiple tape segments to a glass pane, comprising:

a) advancing tape from a supply to a cutter;

b) cutting the tape with the cutting implement to form a first end of a first tape segment;

c) advancing the first end of the first tape segment to a glass engagement position;

d) applying the first end of the first tape segment to the glass pane;

e) cutting the tape with the cutting implement to form a second end of the first tape segment;

f) advancing the second end of the first tape segment to the glass engagement position;

g) applying the second end of the first tape segment to the glass pane;

h) cutting the tape with the cutting implement to form a second tape segment having first and second ends before the second end of the first tape segment is advanced to the glass engagement position; and i) applying the tape segment to the glass pane.

12. The method of claim 11 wherein the cutter comprises a rotary die that rotates at a speed of the tape being cut.

13. The method of claim 11 wherein movement of the drive roller and movement of the application head are coordinated such that a distance traveled by the application head is equal to a length of tape advanced by the drive roller.

14. The method of claim 11 wherein advancement of the tape and movement of an application head are coordinated such that a distance traveled by the application head is equal to a length of tape.

15. The method of claim 11 wherein a first segment to be applied is selected that has a length that is greater than a distance between the cutter and the glass engagement position.

16. The method of claim 15 wherein the length of the first segment to be applied has a length greater than four inches.

17. A method of applying multiple tape segments to a glass pane from a tape dispenser that supports a tape cutter, comprising:

a) moving a glass pane to a tape dispensing station and identifying multiple tape segments to be applied to the glass pane and the position of each tape segment on the glass pane;

b) calculating movements by an application head with respect to the glass pane, a drive roller that advances tape dispensed by the application head, and the tape cutter that defines end portions of each tape segment required to apply the multiple tape segments to the glass pane;

c) sorting the calculated movements based on the calculated movement of the drive roller for each movement to dispense at least a first tape segment that is longer than a certain length before applying any tape segments shorter than said certain length to the glass pane to avoid rewinding tape to position the tape with regard to the tape cutter; and d) executing the movements in the sorted order to apply multiple tape segments from the tape dispenser.

18. The method of claim 17 wherein the first tape segment is applied to a surface at the dispensing station other than said glass pane.

19. The method of claim 17 wherein the first tape segment is applied to a surface of said glass pane.

20. The method of claim 17 wherein the first tape segment is associated with a new pane of glass and wherein a leading edge of the first tape segment was preceded by a tape segment applied to an immediately preceding pane of glass.

* * * * *